(12) United States Patent
Cheng et al.

(10) Patent No.: US 11,662,506 B2
(45) Date of Patent: May 30, 2023

(54) IMAGING OPTICAL ELEMENT SET, IMAGING LENS ASSEMBLY AND ELECTRONIC DEVICE

(71) Applicant: LARGAN PRECISION CO., LTD., Taichung (TW)

(72) Inventors: Chih-Wei Cheng, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 299 days.

(21) Appl. No.: 16/944,331

(22) Filed: Jul. 31, 2020

(65) Prior Publication Data
US 2021/0080623 A1  Mar. 18, 2021

Related U.S. Application Data

(60) Provisional application No. 62/899,209, filed on Sep. 12, 2019.

(30) Foreign Application Priority Data

Nov. 15, 2019  (TW) .................................. 108141659

(51) Int. Cl.
  *G02B 7/02*  (2021.01)
  *G02B 5/00*  (2006.01)
  *G02B 13/18*  (2006.01)

(52) U.S. Cl.
  CPC ............. *G02B 5/003* (2013.01); *G02B 7/021* (2013.01); *G02B 13/18* (2013.01)

(58) Field of Classification Search
  CPC ........ G02B 5/003; G02B 7/021; G02B 13/18; G02B 5/00; G02B 7/02; G02B 15/14;
  (Continued)

(56) References Cited

U.S. PATENT DOCUMENTS 7,158,318 B2   1/2007 Shirie
8,070,304 B2  12/2011 Matsuoka et al.
(Continued)

FOREIGN PATENT DOCUMENTS

TW  201116881 A  5/2011
TW  201901213 A  1/2019

*Primary Examiner* — Balram T Parbadia
(74) *Attorney, Agent, or Firm* — McClure, Qualey & Rodack, LLP

(57) ABSTRACT

An imaging optical element set has an optical axis, and includes an object-side lens element, an image-side lens element and a light blocking sheet. The light blocking sheet is interposed between the object-side lens element and the image-side lens element, and includes an object-side outer surface, an image-side outer surface, an outer diameter portion, an inner diameter portion and a height compensation structure. The image-side outer surface is opposite to the object-side outer surface. The outer diameter portion has an outer diameter surface connected to the object-side outer surface and the image-side outer surface. The inner diameter portion has an inner diameter surface connected to the object-side outer surface and the image-side outer surface. The height compensation structure is in full circle form, and is for adjusting a height difference between the inner diameter surface and the outer diameter surface along a direction parallel to the optical axis.

11 Claims, 35 Drawing Sheets

(58) Field of Classification Search
CPC ...... G03B 17/12; G03B 11/00; H04N 5/2253; H04N 5/2254; H04N 5/2257
See application file for complete search history.

(56) References Cited

U.S. PATENT DOCUMENTS

| | | | |
|---|---|---|---|
| 8,292,524 B1 | 10/2012 | Yu | |
| 8,496,338 B2* | 7/2013 | Ho | G02B 5/005 |
| | | | 359/503 |
| 8,967,814 B2 | 3/2015 | Chang | |
| 9,016,876 B2 | 4/2015 | Lai | |
| 9,442,268 B2 | 9/2016 | Chang | |
| 9,904,049 B2* | 2/2018 | Kim | G02B 5/003 |
| 2004/0120046 A1* | 6/2004 | Shirie | G02B 13/001 |
| | | | 359/601 |
| 2009/0310223 A1* | 12/2009 | Matsuoka | G02B 7/022 |
| | | | 359/601 |
| 2012/0314288 A1* | 12/2012 | Lai | G02B 13/0035 |
| | | | 359/503 |
| 2014/0104691 A1* | 4/2014 | Chang | G02B 7/021 |
| | | | 359/611 |
| 2015/0234145 A1* | 8/2015 | Chang | G02B 5/005 |
| | | | 359/811 |

\* cited by examiner

IMAGING OPTICAL ELEMENT SET, IMAGING LENS ASSEMBLY AND ELECTRONIC DEVICE

RELATED APPLICATIONS

This application claims priority to U.S. Provisional Application Ser. No. 62/899,209, filed Sep. 12, 2019 and Taiwan Application Serial Number 108141659, filed Nov. 15, 2019, which are herein incorporated by reference.

BACKGROUND

Technical Field

The present disclosure relates to an imaging optical element set and an imaging lens assembly. More particularly, the present disclosure relates to an imaging optical element set and an imaging lens assembly applicable to a portable electronic device.

Description of Related Art

In recent years, portable electronic devices have developed rapidly. For example, intelligent electronic devices and tablets have been filled in the lives of modern people, and imaging lens assemblies and imaging optical element sets thereof mounted on portable electronic devices have also prospered. However, as technology advances, the quality requirements of imaging optical element sets are becoming higher and higher, wherein one of main factors affecting an imaging quality is a light blocking sheet.

FIG. 7 is a schematic view of an electronic device 70 of the conventional art, wherein an imaging lens assembly of the electronic device 70 is performed with a baking process. A light blocking sheet 720 is disposed in the electronic device 70, wherein a central layer is made of a plastic material, especially a polyethylene terephthalate (PET) material. During an assembling process of an imaging lens assembly (its reference numeral is omitted), the light blocking sheet 720 is suffered rapid changes of a compression stress and a long-term temperature. In general, a weight range of the compression stress is in tens of kilograms, a temperature changes from room temperature 25° C. to 100° C. in 5 hours back and forth, and the weight range of the compression stress and the temperature changing range are not limited thereto. Due to the surrounding condition changing during the assembling process, a physical structure of the light blocking sheet 720 of the conventional art is prone to an unrecoverable variation. In detail, the unrecoverable variation is a warpage or an irregular distortion of an inner opening of the light blocking sheet 720, wherein the warpage is 56.6 μm to 75.5 μm, and the warpage is not limited thereto. Hence, a blocking efficiency of the light blocking sheet 720 is decreased, the imaging quality is worse, and an optical resolution is lower than expected.

SUMMARY

According to one aspect of the present disclosure, an imaging optical element set has an optical axis, and includes at least one object-side lens element, at least one image-side lens element and at least one light blocking sheet. The light blocking sheet is interposed between the object-side lens element and the image-side lens element, and includes an object-side outer surface, an image-side outer surface, an outer diameter portion, an inner diameter portion and a height compensation structure. The object-side outer surface is toward an object side of the imaging optical element set. The image-side outer surface is opposite to the object-side outer surface. The outer diameter portion has an outer diameter surface connected to the object-side outer surface and the image-side outer surface. The inner diameter portion defines a central opening of the light blocking sheet, and has an inner diameter surface connected to the object-side outer surface and the image-side outer surface. The height compensation structure is in full circle form, surrounds the central opening, and is for adjusting a height difference between the inner diameter surface and the outer diameter surface along a direction parallel to the optical axis. When a maximum height of the height compensation structure is H, and the height difference between the inner diameter surface and the outer diameter surface along the direction parallel to the optical axis is Δd, the following condition is satisfied: $0.0 \leq \Delta d/H < 0.85$.

According to one aspect of the present disclosure, an imaging lens assembly includes a lens barrel and the imaging optical element set of the aforementioned aspect. The imaging optical element set is disposed in the lens barrel, and the central opening of the light blocking sheet of the imaging optical element set is corresponding to a minimum central opening of the lens barrel.

According to one aspect of the present disclosure, an electronic device includes the imaging lens assembly of the aforementioned aspect and an image sensor. The image sensor is disposed on an image surface of the imaging lens assembly.

BRIEF DESCRIPTION OF THE DRAWINGS

FIG. 10 is a schematic view of the light blocking sheet according to the 1st example in FIG. 1A.

DETAILED DESCRIPTION

Figure 1A:
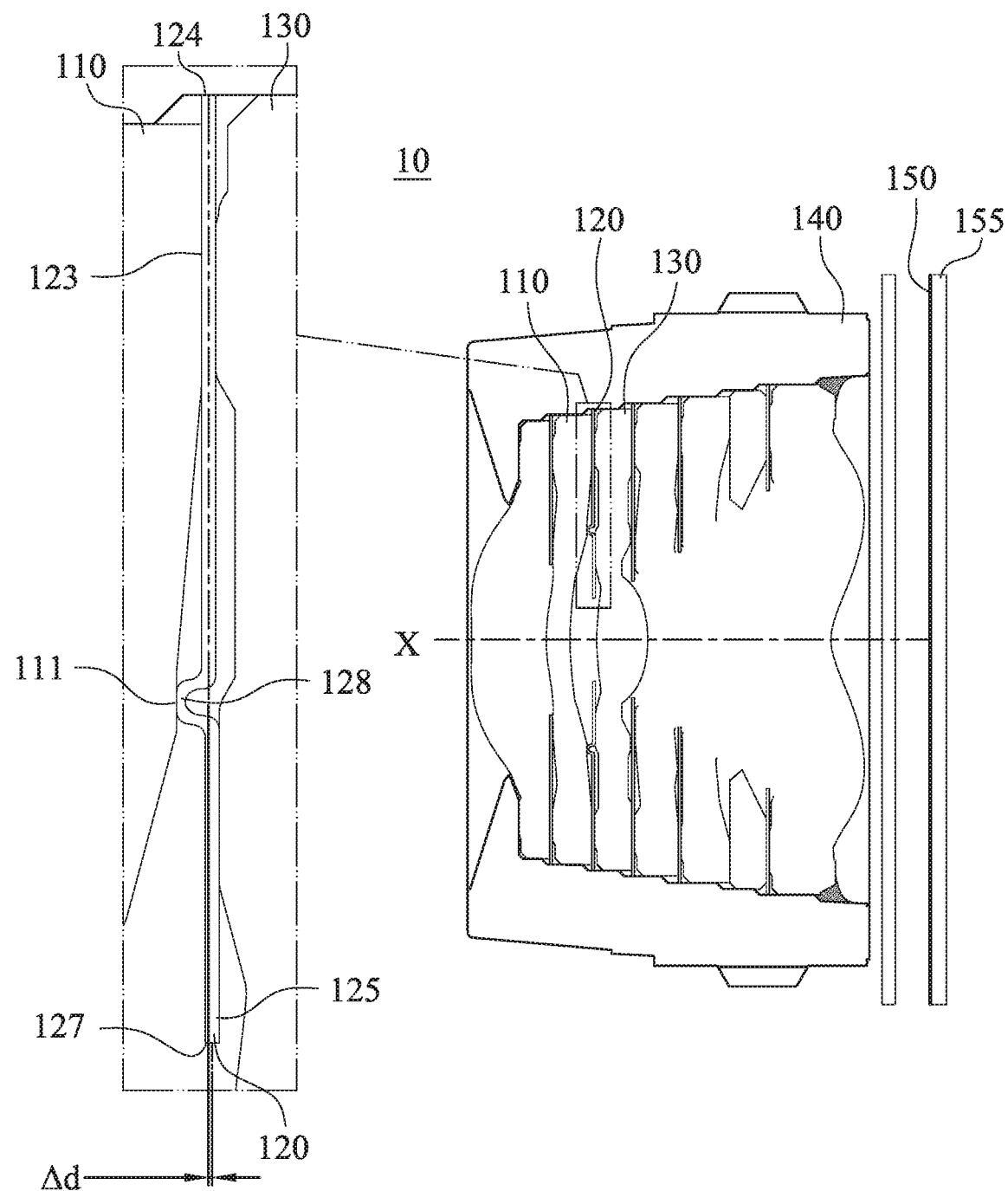
FIG. 1A is a schematic view of an electronic device according to the 1st example of the present disclosure, wherein an imaging lens assembly of the electronic device is performed without a baking process.

The present disclosure provides an imaging optical element set, which has an optical axis, and includes at least one object-side lens element, at least one image-side lens element and at least one light blocking sheet. The light blocking sheet is interposed between the object-side lens element and the image-side lens element, and includes an object-side outer surface, an image-side outer surface, an outer diameter portion, an inner diameter portion and a height compensation structure. The object-side outer surface is toward an object side of the imaging optical element set. The image-side outer surface is opposite to the object-side outer surface. The outer diameter portion has an outer diameter surface connected to the object-side outer surface and the image-side outer surface. The inner diameter portion defines a central opening of the light blocking sheet, and has an inner diameter surface connected to the object-side outer surface and the image-side outer surface. The height compensation structure is in full circle form, surrounds the central opening, and is for adjusting a height difference between the inner diameter surface and the outer diameter surface along a direction parallel to the optical axis. When a maximum height of the height compensation structure is H, and the height difference between the inner diameter surface and the outer diameter surface along the direction parallel to the optical axis is Δd, the following condition is satisfied: $0.0 \leq \Delta d/H < 0.85$. Therefore, it is favorable for promoting an applicable range of the height compensation structure, and it is also favorable for controlling a warpage of the inner diameter portion to decrease an excessive warpage or an excessive correction.

The height compensation structure can be directly contacted with an adjacent lens element. Via a space arrangement of a lens element, a supporting effect of a structure can be further used, and an ability of improving the warpage and a distortion can be promoted.

The lens element adjacent to the height compensation structure can include a full circle form structure surface for corresponding to and being directly contacted with the height compensation structure. Therefore, a supporting stability of the lens element and the height compensation structure can be increased, and it is favorable for controlling a changing trend of the warpage to further promote an accuracy of compensating for the warpage.

The height compensation structure, in order from the outer diameter surface of the light blocking sheet to the central opening, can include a first side wall and a second side wall. The first side wall extends from one of the object-side outer surface and the image-side outer surface to away from the other one of the object-side outer surface and the image-side outer surface. The second side wall extends from the one of the object-side outer surface and the image-side outer surface to close to the other one of the object-side outer surface and the image-side outer surface. Therefore, it is favorable for decreasing a failure possibility of the light blocking sheet by providing an intrinsic strength over a material itself.

The central opening of the light blocking sheet can be an aperture stop of the imaging optical element set. Therefore, a characteristic of the aperture stop can be more stable, and an optical specification and an imaging performance of the imaging optical element set are much less susceptible to surroundings.

The light blocking sheet can be a composite light blocking sheet, and the light blocking sheet can further include a first surface layer, a second surface layer and an inside substrate layer, wherein the inside substrate layer is located between the first surface layer and the second surface layer, and the inside substrate layer is connected to the first surface layer and the second surface layer. Furthermore, the inside substrate layer is made of a plastic material layer, and the first surface layer and the second surface layer are made of a black carbon material layer, wherein the plastic material layer can be a black/transparent polycarbonate (PC) material, a black/transparent polyethylene terephthalate (PET) material or a black/transparent poly(methyl methacrylate) (PMMA) material. Furthermore, the light blocking sheet can be made of a metal material, and an appearance of the light blocking sheet is black, but is not limited thereto.

When the maximum height of the height compensation structure is H, and the height difference between the inner diameter surface and the outer diameter surface along the direction parallel to the optical axis is $\Delta d$, the following condition can be satisfied: $0.0 \leq \Delta d/H < 0.55$. Therefore, it is resistant to the longer high temperature baking test, and it is favorable for withstanding the heavier compression stress. Furthermore, the following condition can be satisfied: $0.0 \leq \Delta d/H < 0.35$. Therefore, it is favorable for obtaining a better three-dimensional structure. Also, a precision of a process of the light blocking sheet can be more controllable, and an abnormal situation of a breaking of the light blocking sheet is less easily happened.

When a thickness of the light blocking sheet is s, the following condition can be satisfied: $0.0$ mm$<s<0.12$ mm. Therefore, it is favorable for providing a better light blocking effect, and a situation of a surface reflection of elements can be reduced.

When the maximum height of the height compensation structure is H, and the thickness of the light blocking sheet is s, the following condition can be satisfied: $0.7 \leq H/s < 5.0$. Therefore, it is favorable for increasing a durability of the light blocking sheet.

When the height difference between the inner diameter surface and the outer diameter surface along the direction parallel to the optical axis is $\Delta d$, the following condition can be satisfied: $0.0$ mm$\leq \Delta d<0.02$ mm. Therefore, the excessive correction or an insufficient correction are less easily happened.

Each of the aforementioned features of the imaging optical element set can be utilized in various combinations for achieving the corresponding effects.

The present disclosure provides an imaging lens assembly, which includes a lens barrel and the aforementioned imaging optical element set. The imaging optical element set is disposed in the lens barrel, and the central opening of the light blocking sheet of the imaging optical element set is corresponding to a minimum central opening of the lens barrel. Therefore, it is favorable for providing a necessary condition for the imaging lens assembly to block a non-imaging light, a suitable light blocking sheet is provided according to an assembling process condition of the imaging lens assembly.

The present disclosure provides an electronic device, which includes the aforementioned imaging lens assembly and an image sensor. The image sensor is disposed on an image surface of the imaging lens assembly.

According to the aforementioned embodiment, specific examples are provided, and illustrated via figures.

1st Example

Figure 1B:
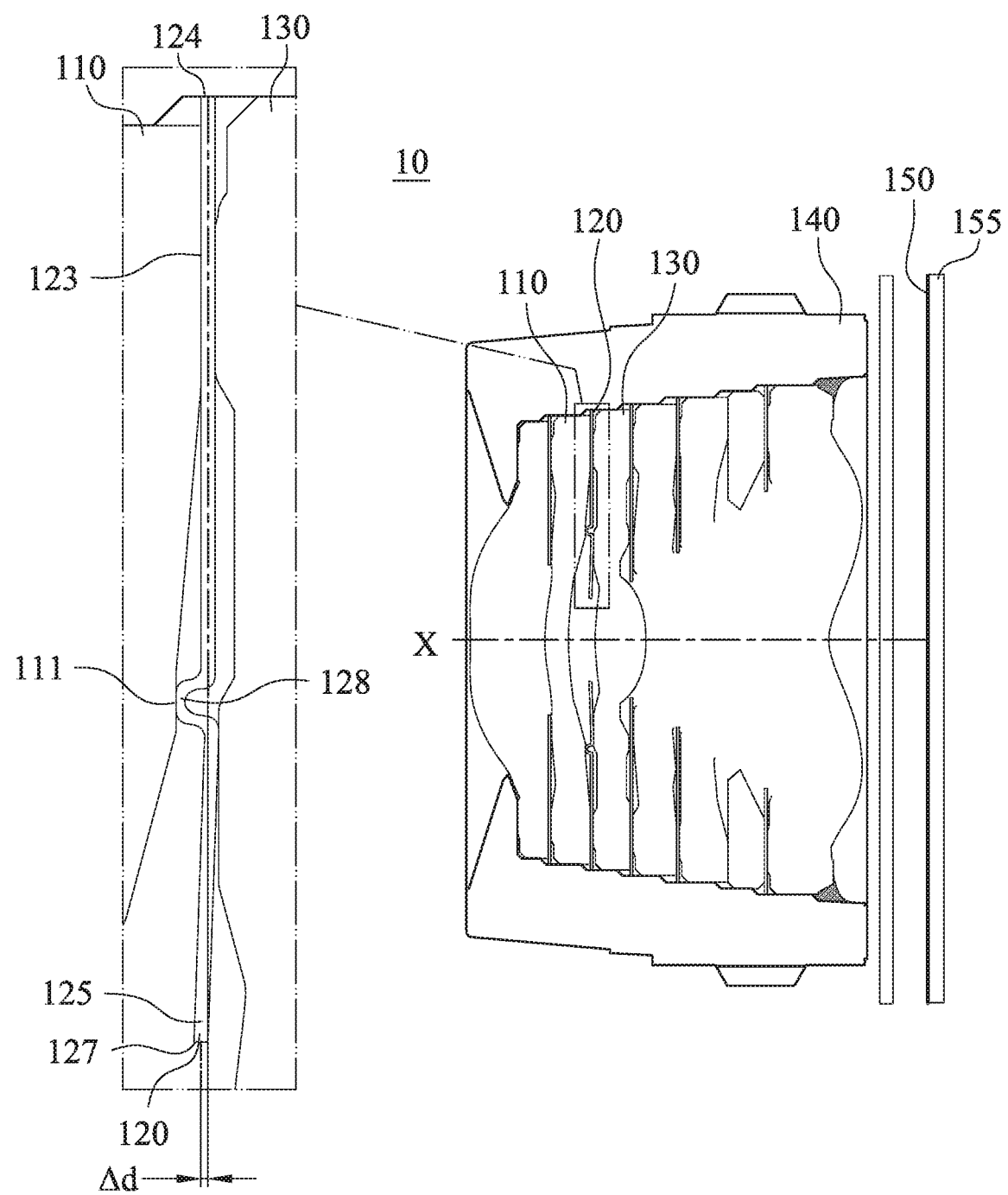
FIG. 1B is another schematic view of the electronic device according to the 1st example in FIG. 1A, wherein the imaging lens assembly of the electronic device is performed with the baking process.

FIG. 1A is a schematic view of an electronic device 10 according to the 1st example of the present disclosure, wherein an imaging lens assembly of the electronic device 10 is performed without a baking process. FIG. 1B is another schematic view of the electronic device 10 according to the 1st example in FIG. 1A, wherein the imaging lens assembly of the electronic device 10 is performed with the baking process. In FIGS. 1A and 1B, the electronic device 10 includes the imaging lens assembly (its reference numeral is omitted) and an image sensor 155. The image sensor 155 is disposed on an image surface 150 of the imaging lens assembly. The imaging lens assembly includes a lens barrel 140 and an imaging optical element set (its reference numeral is omitted). The imaging optical element set is disposed in the lens barrel 140, and a central opening 126 of the light blocking sheet 120 of the imaging optical element set is corresponding to a minimum central opening (its reference numeral is omitted) of the lens barrel 140. Therefore, it is favorable for providing a necessary condition for the imaging lens assembly to block a non-imaging light, a suitable light blocking sheet is provided according to an assembling process condition of the imaging lens assembly.

In detail, the imaging optical element set has an optical axis X, and includes at least one object-side lens element, at least one image-side lens element and at least one light blocking sheet. According to the 1st example, the light blocking sheet 120 is interposed between the object-side lens element 110 and the image-side lens element 130. Furthermore, the object-side lens element 110, the light blocking sheet 120 and the image-side lens element 130 are disposed in order from an object side to an image side. The imaging optical element set further includes a plurality of lens elements, wherein the lens elements can be disposed according to different imaging demands, and the structures, the surface shapes and so on are not important to the present disclosure, and will not disclose details thereof herein.

FIG. 1O is a schematic view of the light blocking sheet 120 according to the 1st example in FIG. 1A. FIG. 1D is a side view of the light blocking sheet 120 according to the 1st example in FIG. 1A. FIG. 1E is a schematic view of an object-side outer surface 121 of the light blocking sheet 120 according to the 1st example in FIG. 1A. FIG. 1F is a partially cross-sectional view of the light blocking sheet 120 according to the 1st example in FIG. 1A. FIG. 1G is a schematic view of an image-side outer surface 122 of the light blocking sheet 120 according to the 1st example in FIG. 1A. FIG. 1H is another partially cross-sectional view of the light blocking sheet 120 according to the 1st example in FIG. 1A. In FIGS. 1O to 1H, the light blocking sheet 120 includes the object-side outer surface 121, the image-side outer surface 122, an outer diameter portion 123, an inner diameter portion 125 and a height compensation structure 128.

The object-side outer surface 121 is toward an object side of the imaging optical element set, and the image-side outer surface 122 is opposite to the object-side outer surface 121. The outer diameter portion 123 has an outer diameter surface 124 connected to the object-side outer surface 121 and the image-side outer surface 122. The inner diameter portion 125 defines the central opening 126 of the light blocking sheet 120, and has an inner diameter surface 127 connected to the object-side outer surface 121 and the image-side outer surface 122.

The height compensation structure 128 is in full circle form, surrounds the central opening 126, and for adjusting a height difference between the inner diameter surface 127 and the outer diameter surface 124 along a direction parallel to the optical axis X. Therefore, it is favorable for promoting an applicable range of the height compensation structure 128, and it is also favorable for controlling a warpage of the inner diameter portion 125 to decrease an excessive warpage or an excessive correction.

In detail, in FIGS. 1A and 1B, the height compensation structure 128 can be directly contacted with an adjacent lens element, and the lens element adjacent to the height compensation structure 128 can include a full circle form structure surface 111 for corresponding to and being directly contacted with the height compensation structure 128. Via a space arrangement of the lens element, a supporting effect of a structure can be further used, and an ability of improving the warpage and a distortion can be promoted. According to the 1st example, the height compensation structure 128 is directly contacted with the object-side lens element 110, and the object-side lens element 110 includes the full circle form structure surface 111 for corresponding to and being directly contacted with the height compensation structure 128. Therefore, the supporting stability of the object-side lens element 110 and the height compensation structure 128 can be increased, and it is favorable for controlling a changing trend of the warpage to further promote an accuracy of compensating for the warpage. According to the 1st example, a warpage of suffering a compression stress is −6.0 μm, a warpage of suffering the compression stress and the baking process is 11.5 μm. Moreover, the warpage is the height difference Δd between the inner diameter surface 127 and the outer diameter surface 124 along the direction parallel to the optical axis X.

Figure 1C:
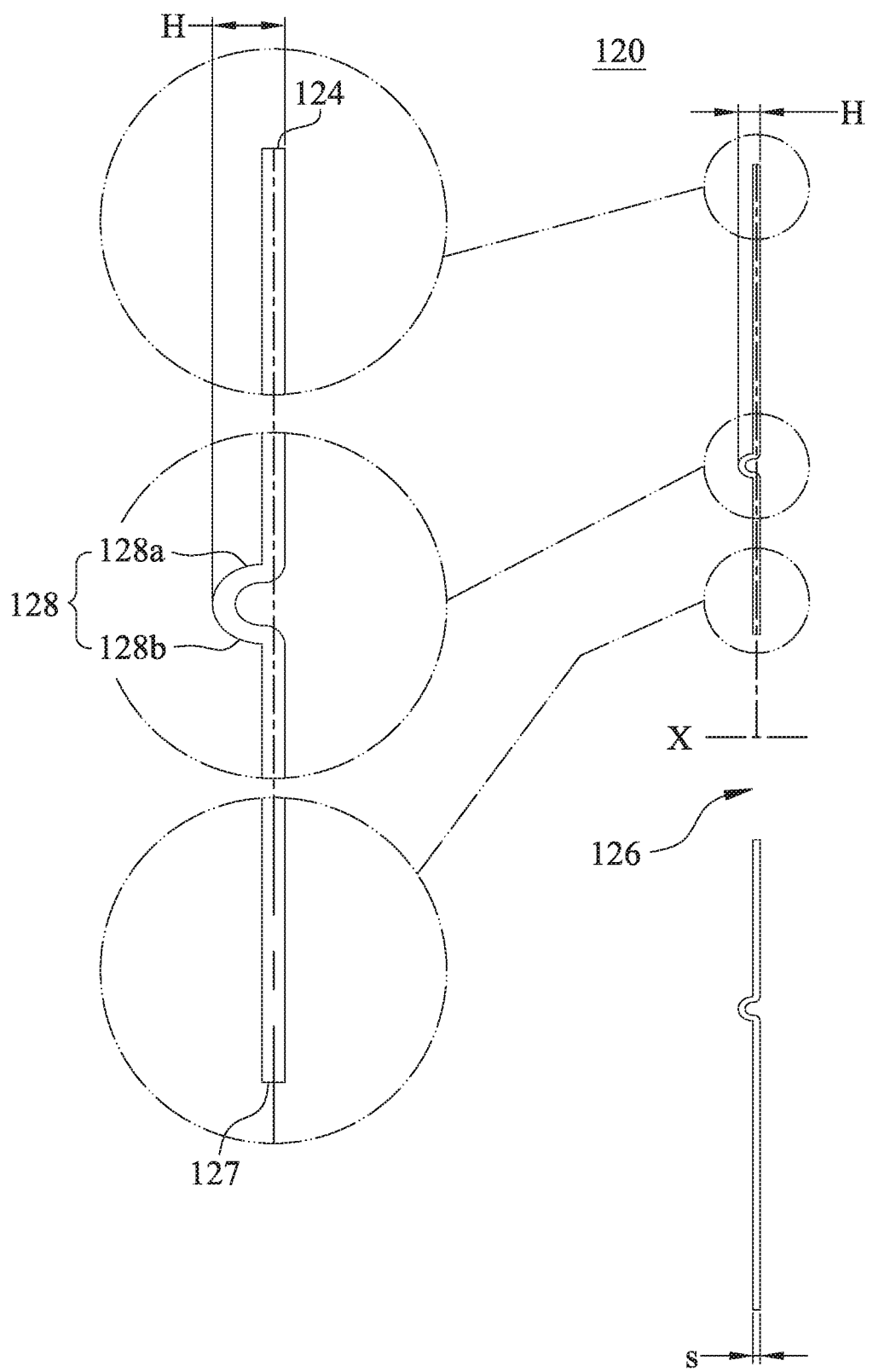
FIG. 1D is a side view of the light blocking sheet according to the 1st example in FIG. 1A.
FIG. 1E is a schematic view of an object-side outer surface of the light blocking sheet according to the 1st example in FIG. 1A.
FIG. 1F is a partially cross-sectional view of the light blocking sheet according to the 1st example in FIG. 1A.
FIG. 1G is a schematic view of an image-side outer surface of the light blocking sheet according to the 1st example in FIG. 1A.
FIG. 1H is another partially cross-sectional view of the light blocking sheet according to the 1st example in FIG. 1A.
Figure 1D:
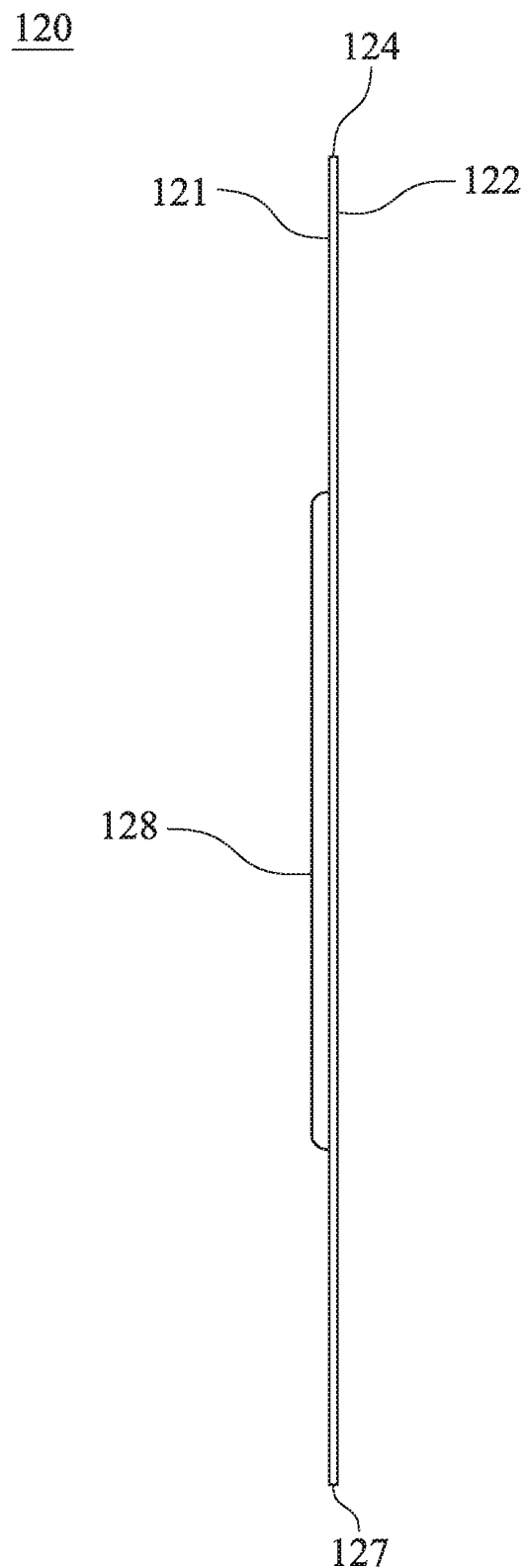
Figure 1E:
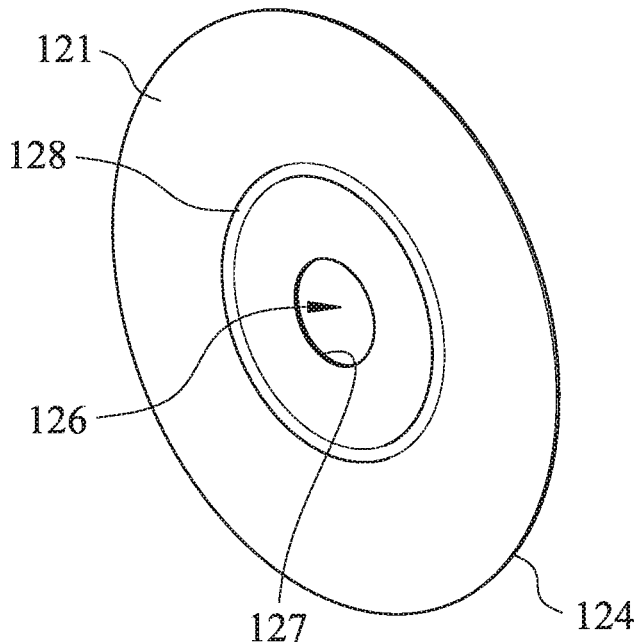
Figure 1F:
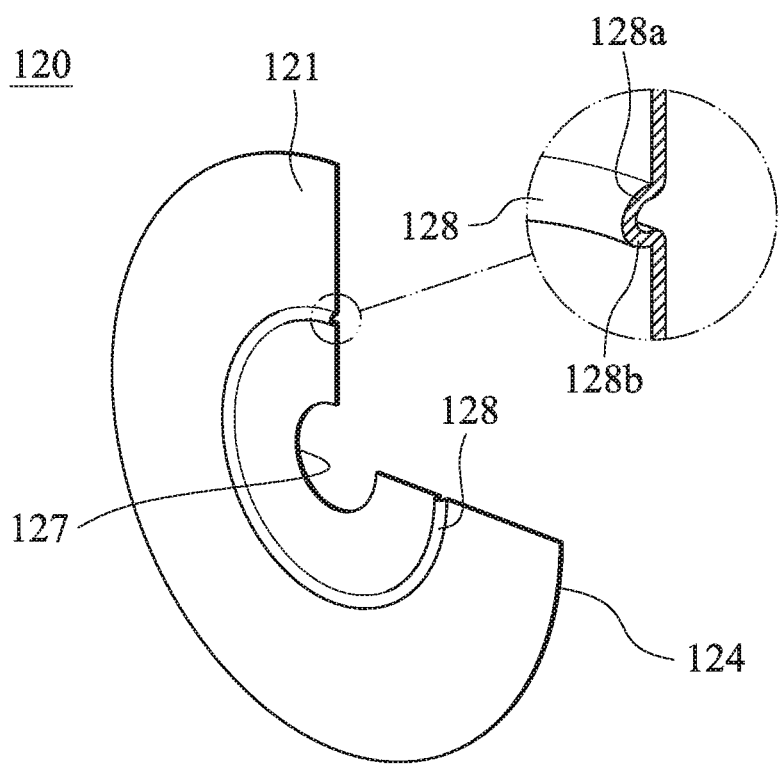
Figure 1G:
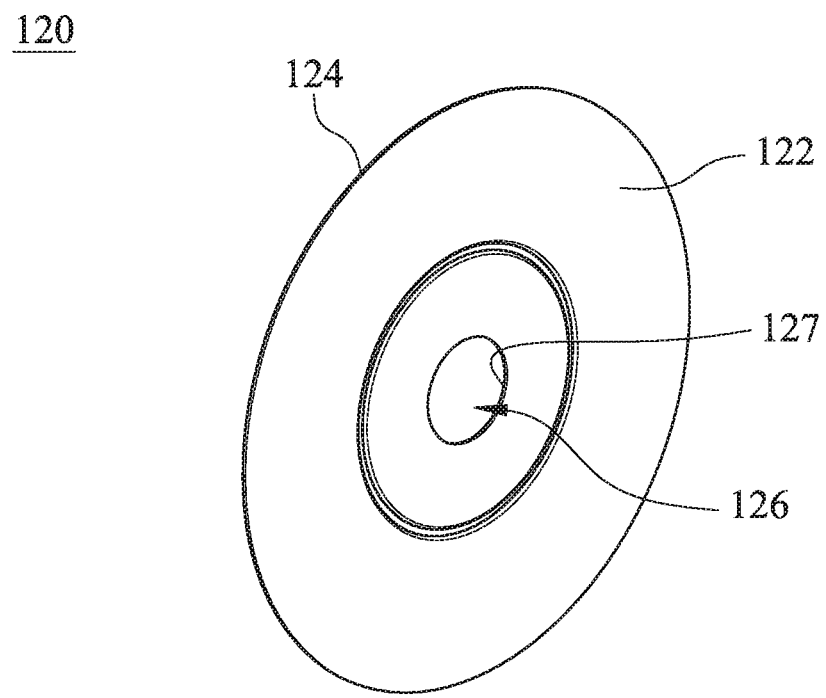
Figure 1H:
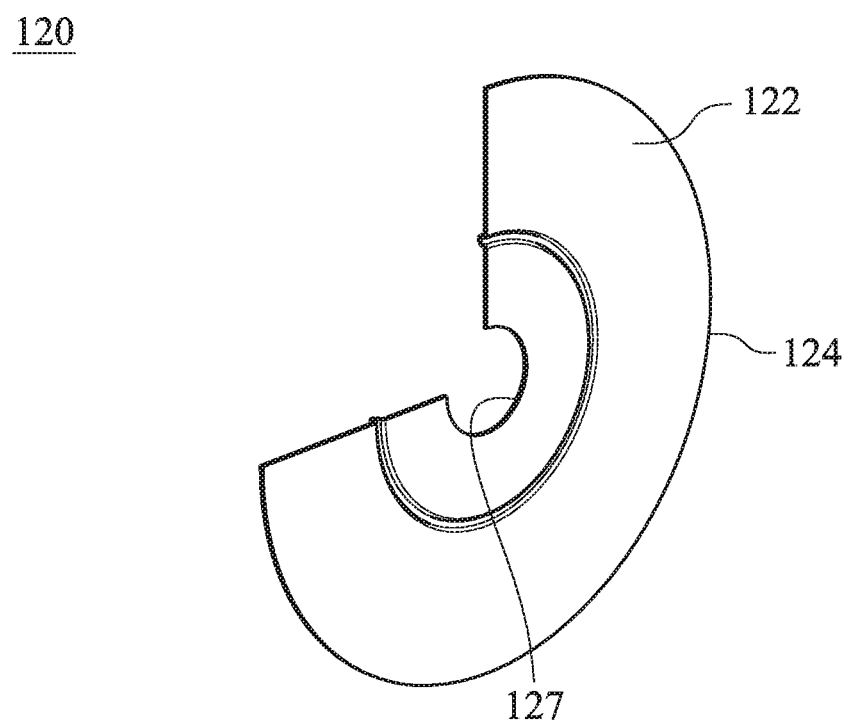

In FIGS. 1C and 1F, the height compensation structure 128, in order from the outer diameter surface 124 of the light blocking sheet 120 to the central opening 126, can include a first side wall 128a and a second side wall 128b. The first side wall 128a extends from one of the object-side outer surface 121 and the image-side outer surface 122 to away from the other one of the object-side outer surface 121 and the image-side outer surface 122. The second side wall 128b extends from the one of the object-side outer surface 121 and the image-side outer surface 122 to close to the other one of the object-side outer surface 121 and the image-side outer surface 122. In detail, the first side wall 128a, the second side wall 128b and the inner diameter surface 127 are disposed in order from the outer diameter portion 123 of the light blocking sheet 120 to the central opening 126. Therefore, it is favorable for decreasing a failure possibility of the light blocking sheet 120 by providing an intrinsic strength over a material itself.

The light blocking sheet 120 can be made of a metal material, and an appearance of the light blocking sheet 120 is black, but is not limited thereto.

The central opening 126 of the light blocking sheet 120 can be an aperture stop of the imaging optical element set. Therefore, a characteristic of the aperture stop can be more stable, and an optical specification and an imaging performance of the imaging optical element set are much less susceptible to surroundings.

In FIGS. 1A and 1O, according to the 1st example, when the maximum height of the height compensation structure 128 is H, furthermore, the height compensation structure 128 extends from the object side of the imaging optical element set, the maximum height is from the image-side outer surface 122 to a top of the height compensation structure 128, the height difference between the inner diameter surface 127 and the outer diameter surface 124 along the direction parallel to the optical axis X is Δd, a thickness of the light blocking sheet 120 is s, the following conditions of the Table 1 are satisfied.

TABLE 1

| 1st example | |
|---|---|
| H (mm) | 0.073 |
| Δd (mm) (suffering the compression stress) | 0.006 |
| Δd (mm) (suffering the compression stress and the baking process) | 0.0115 |
| Δd/H (suffering the compression stress) | 0.082 |
| Δd/H (suffering the compression stress and the baking process) | 0.158 |
| s (mm) | 0.023 |
| H/s | 3.174 |

2nd Example

Figure 2A:
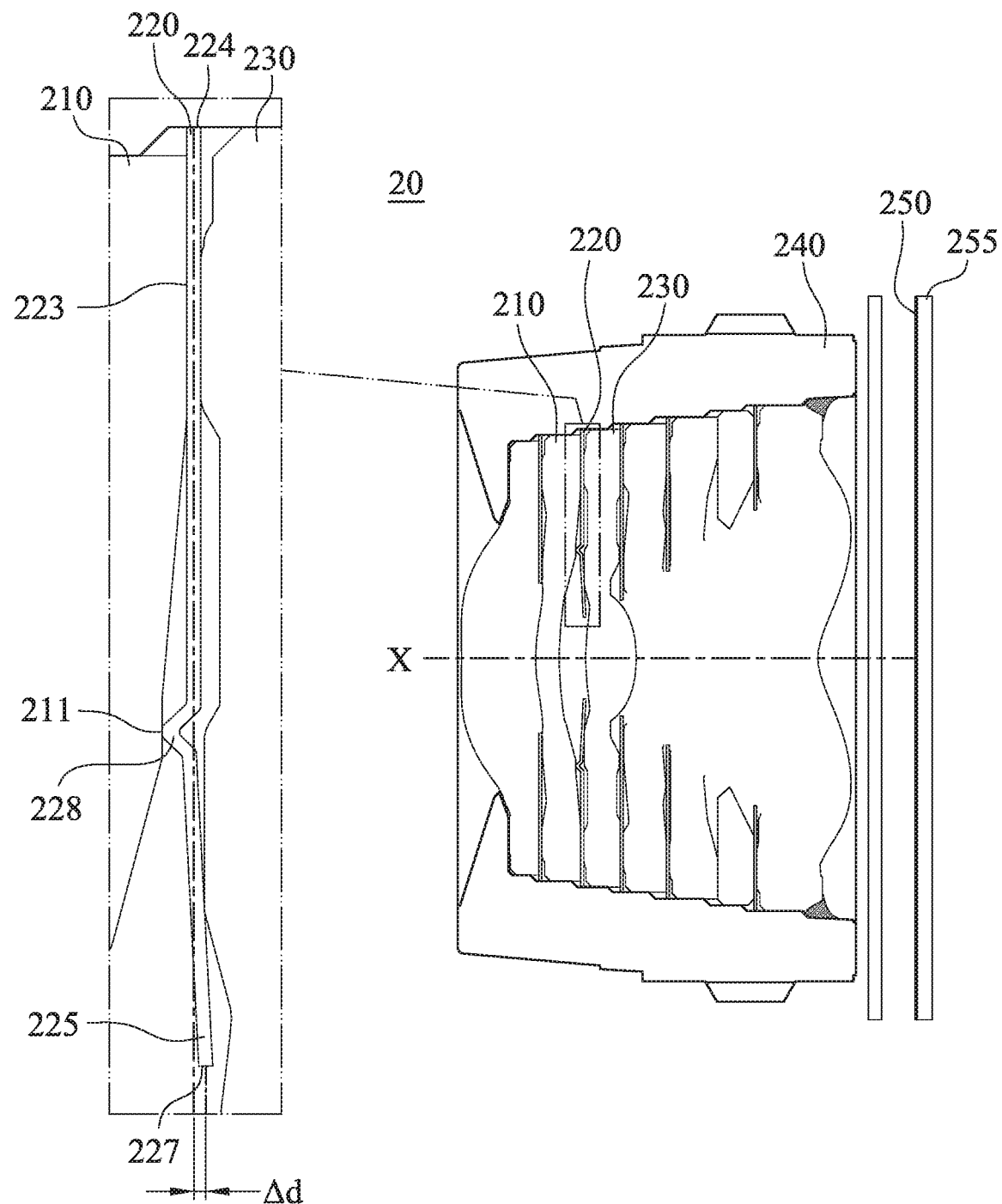
FIG. 2A is a schematic view of an electronic device according to the 2nd example of the present disclosure, wherein an imaging lens assembly of the electronic device is performed without a baking process.
Figure 2B:
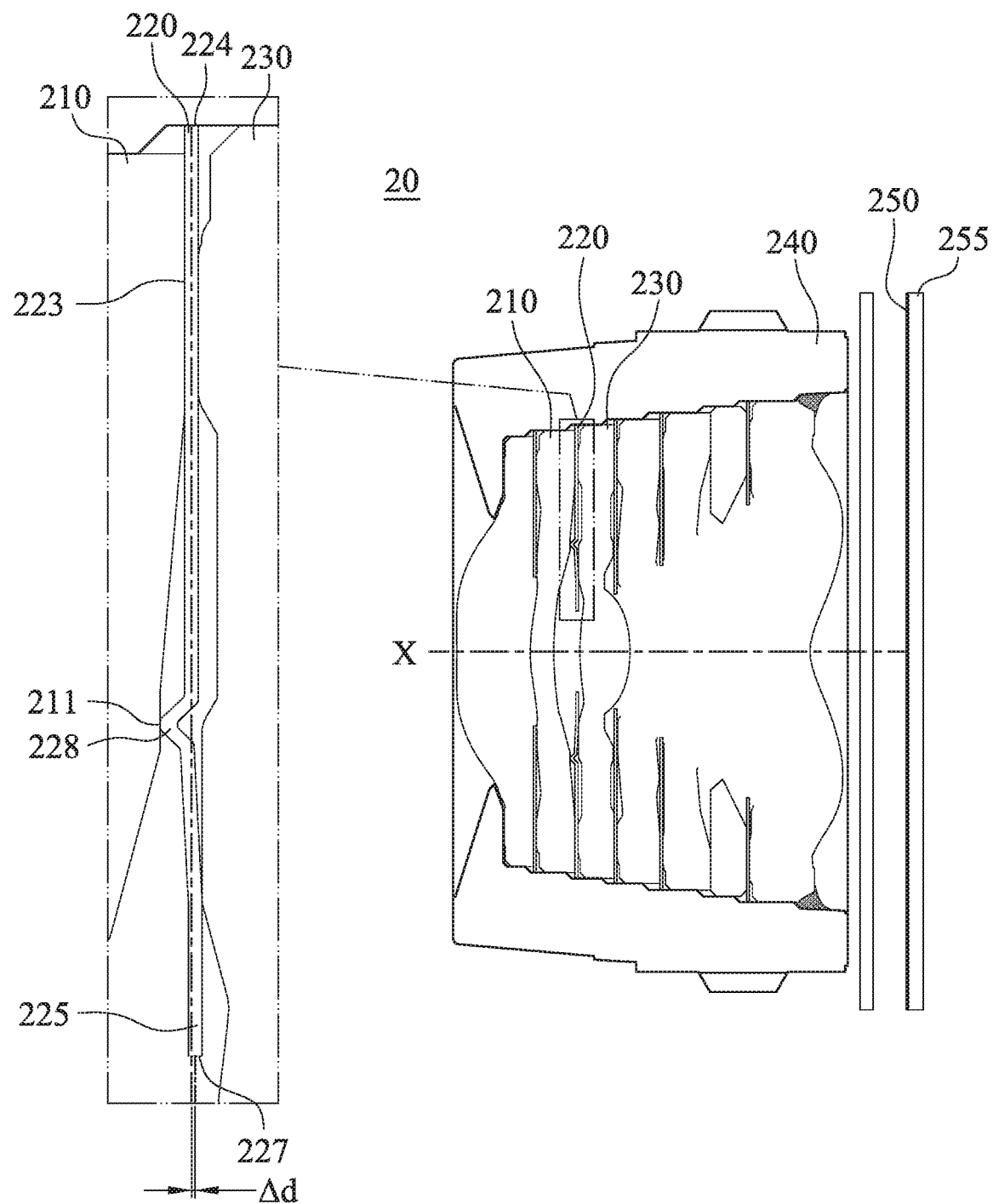
FIG. 2B is another schematic view of the electronic device according to the 2nd example in FIG. 2A, wherein the imaging lens assembly of the electronic device is performed with the baking process.

FIG. 2A is a schematic view of an electronic device 20 according to the 2nd example of the present disclosure, wherein an imaging lens assembly of the electronic device 20 is performed without a baking process. FIG. 2B is another schematic view of the electronic device 20 according to the 2nd example in FIG. 2A, wherein the imaging lens assembly of the electronic device 20 is performed with the baking process. In FIGS. 2A and 2B, the electronic device 20 includes the imaging lens assembly (its reference numeral is omitted) and an image sensor 255. The image sensor 255 is disposed on an image surface 250 of the imaging lens assembly. The imaging lens assembly includes a lens barrel 240 and an imaging optical element set (its reference numeral is omitted). The imaging optical element set is disposed in the lens barrel 240, and a central opening 226 of the light blocking sheet 220 of the imaging optical element set is corresponding to a minimum central opening (its reference numeral is omitted) of the lens barrel 240. Therefore, it is favorable for providing a necessary condition for the imaging lens assembly to block a non-imaging light, a suitable light blocking sheet is provided according to an assembling process condition of the imaging lens assembly.

In detail, the imaging optical element set has an optical axis X, and includes at least one object-side lens element, at least one image-side lens element and at least one light blocking sheet. According to the 2nd example, the light blocking sheet 220 is interposed between the object-side lens element 210 and the image-side lens element 230. Furthermore, the object-side lens element 210, the light blocking sheet 220 and the image-side lens element 230 are disposed in order from an object side to an image side. The imaging optical element set further includes a plurality of lens elements, wherein the lens elements can be disposed according to different imaging demands, and the structures, the surface shapes and so on are not important to the present disclosure, and will not disclose details thereof herein.

Figure 2C:
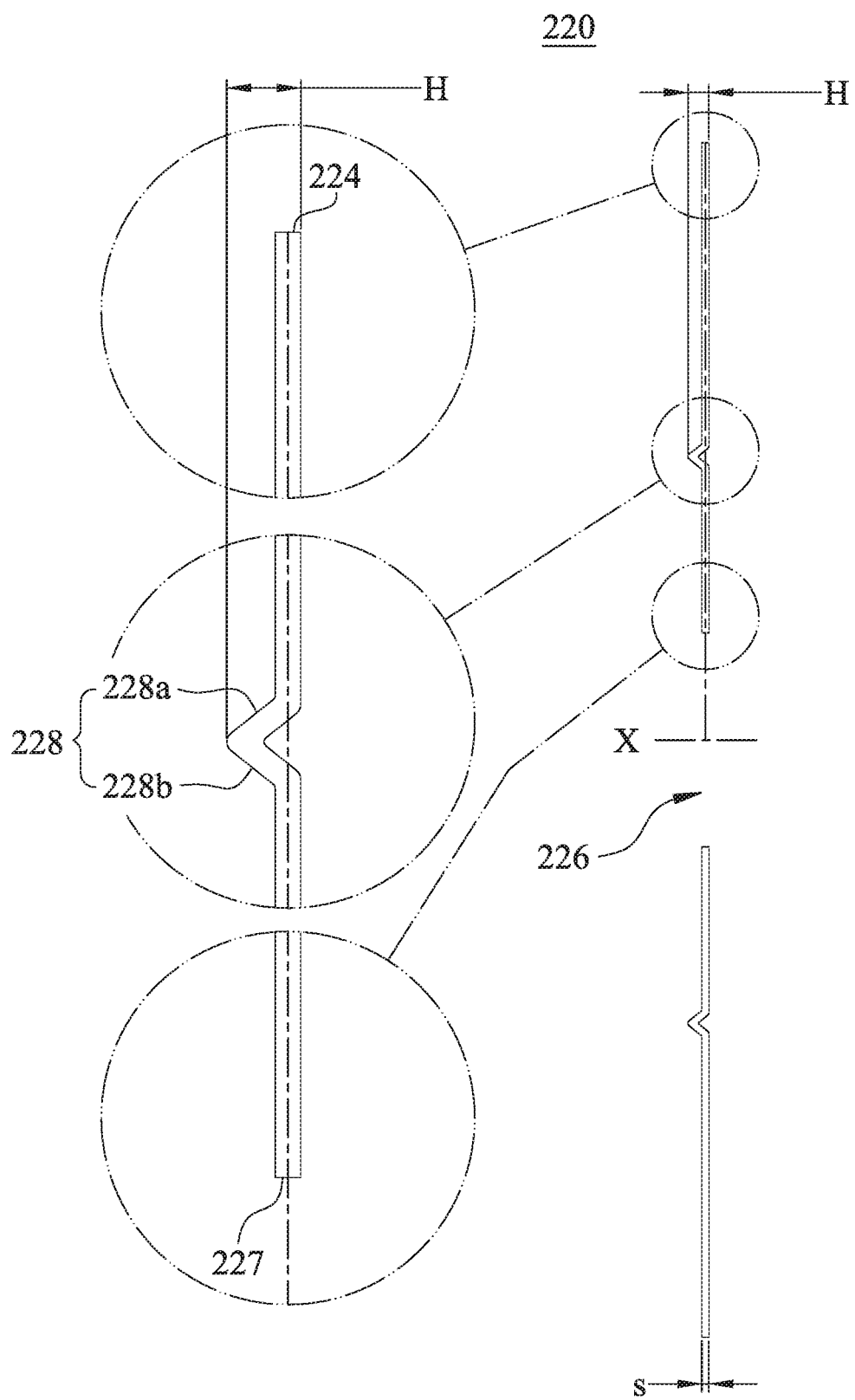
FIG. 2C is a schematic view of the light blocking sheet according to the 2nd example in FIG. 2A.
Figure 2D:
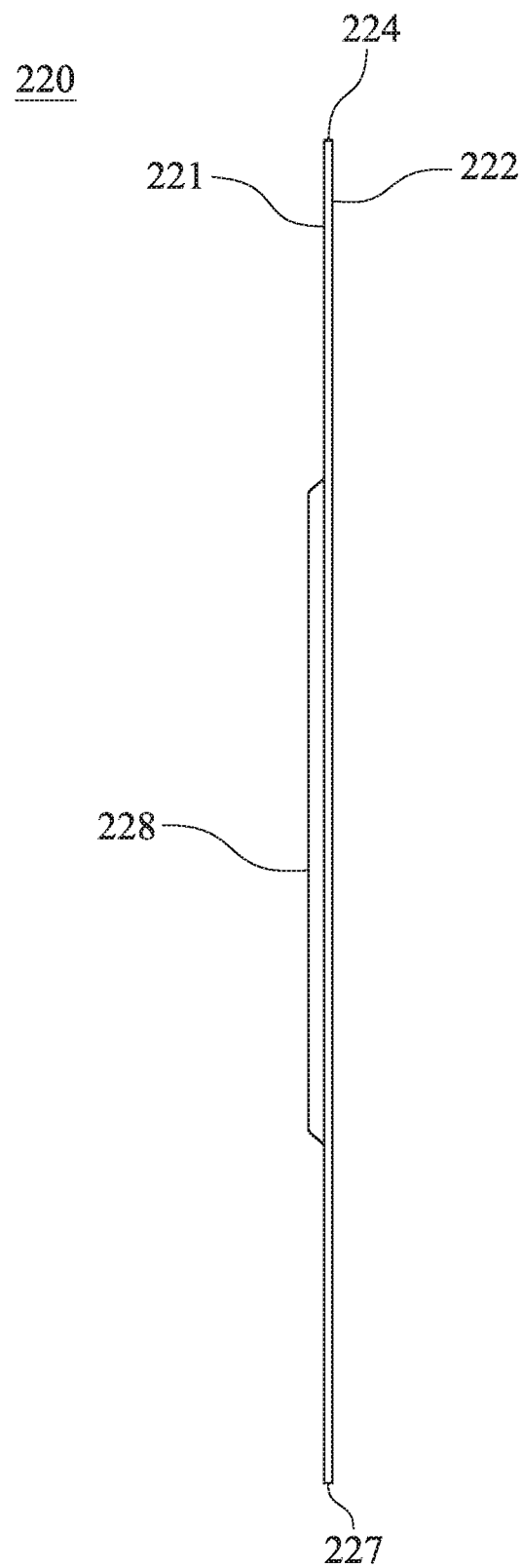
FIG. 2D is a side view of the light blocking sheet according to the 2nd example in FIG. 2A.
Figure 2E:
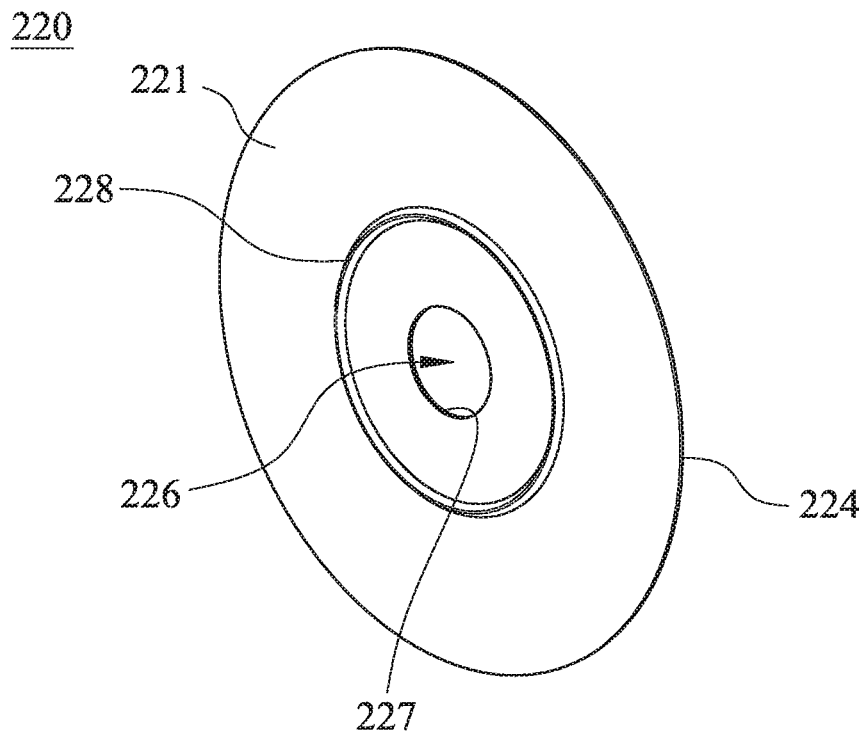
FIG. 2E is a schematic view of an object-side outer surface of the light blocking sheet according to the 2nd example in FIG. 2A.
Figure 2F:
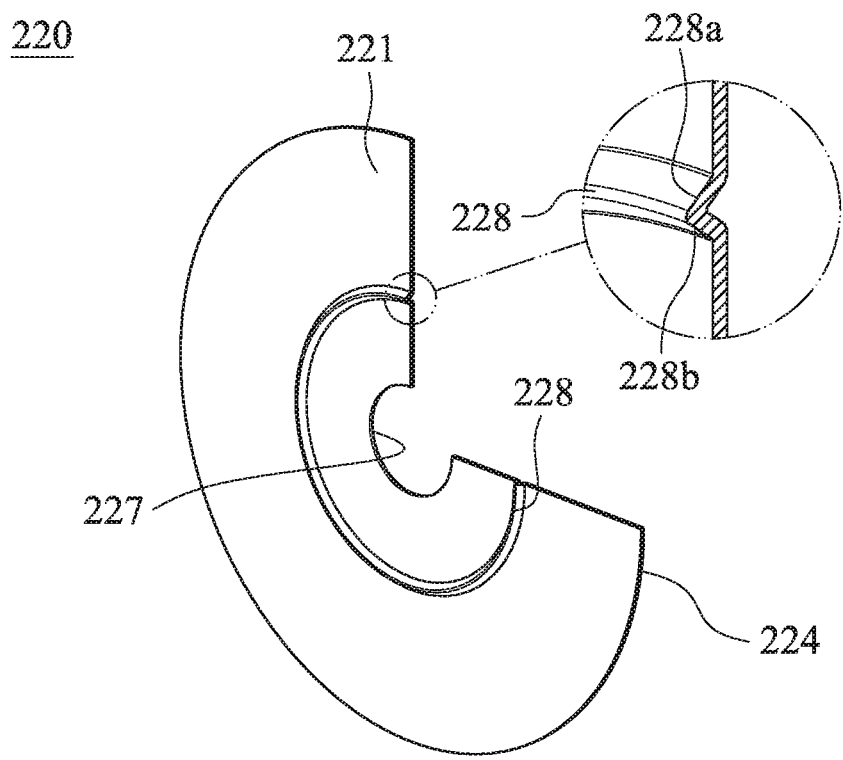
FIG. 2F is a partially cross-sectional view of the light blocking sheet according to the 2nd example in FIG. 2A.
Figure 2G:
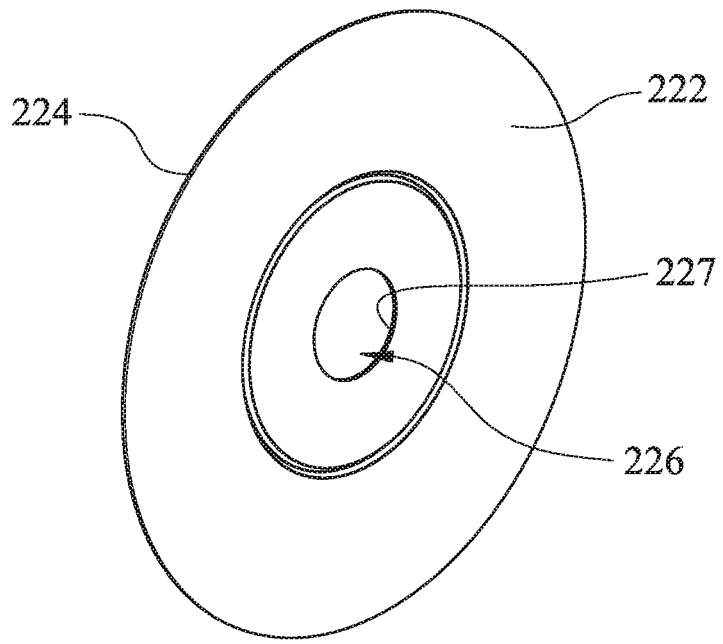
FIG. 2G is a schematic view of an image-side outer surface of the light blocking sheet according to the 2nd example in FIG. 2A.
Figure 2H:
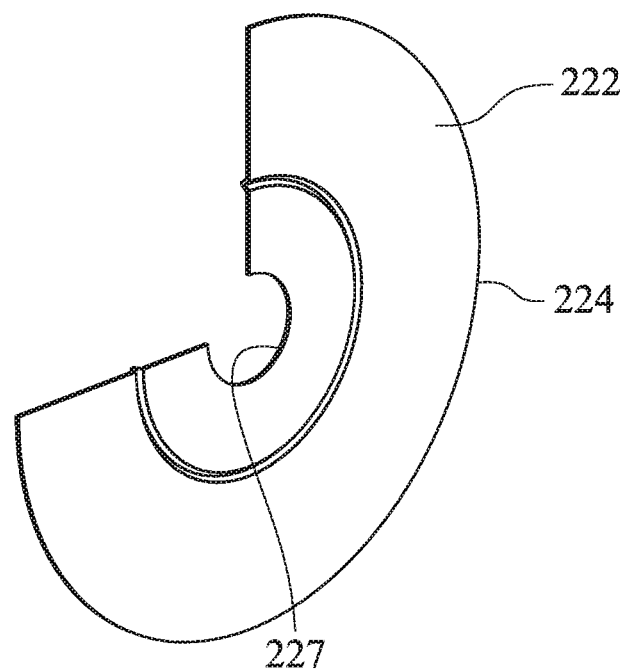
FIG. 2H is another partially cross-sectional view of the light blocking sheet according to the 2nd example in FIG. 2A.

FIG. 2C is a schematic view of the light blocking sheet 220 according to the 2nd example in FIG. 2A. FIG. 2D is a side view of the light blocking sheet 220 according to the 2nd example in FIG. 2A. FIG. 2E is a schematic view of an object-side outer surface 221 of the light blocking sheet 220 according to the 2nd example in FIG. 2A. FIG. 2F is a partially cross-sectional view of the light blocking sheet 220 according to the 2nd example in FIG. 2A. FIG. 2G is a schematic view of an image-side outer surface 222 of the light blocking sheet 220 according to the 2nd example in FIG. 2A. FIG. 2H is another partially cross-sectional view of the light blocking sheet 220 according to the 2nd example in FIG. 2A. In FIGS. 2C to 2H, the light blocking sheet 220 includes the object-side outer surface 221, the image-side outer surface 222, an outer diameter portion 223, an inner diameter portion 225 and a height compensation structure 228.

The object-side outer surface 221 is toward an object side of the imaging optical element set, and the image-side outer surface 222 is opposite to the object-side outer surface 221. The outer diameter portion 223 has an outer diameter surface 224 connected to the object-side outer surface 221 and the image-side outer surface 222. The inner diameter portion 225 defines the central opening 226 of the light blocking sheet 220, and has an inner diameter surface 227 connected to the object-side outer surface 221 and the image-side outer surface 222.

The height compensation structure 228 is in full circle form, surrounds the central opening 226, and for adjusting a height difference between the inner diameter surface 227 and the outer diameter surface 224 along a direction parallel to the optical axis X. Therefore, it is favorable for promoting an applicable range of the height compensation structure 228, and it is also favorable for controlling a warpage of the inner diameter portion 225 to decrease an excessive warpage or an excessive correction.

In detail, in FIGS. 2A and 2B, the height compensation structure 228 can be directly contacted with an adjacent lens element, and the lens element adjacent to the height compensation structure 228 can include a full circle form structure surface 211 for corresponding to and being directly contacted with the height compensation structure 228. Via a space arrangement of the lens element, a supporting effect of a structure can be further used, and an ability of improving the warpage and a distortion can be promoted. According to the 2nd example, the height compensation structure 228 is directly contacted with the object-side lens element 210, and the object-side lens element 210 includes the full circle form structure surface 211 for corresponding to and being directly contacted with the height compensation structure 228. Therefore, the supporting stability of the object-side lens element 210 and the height compensation structure 228 can be increased, and it is favorable for controlling a changing trend of the warpage to further promote an accuracy of compensating for the warpage. According to the 2nd example, a warpage of suffering a compression stress is −19.7 μm, a warpage of suffering the compression stress and the baking process is 6.2 μm. Moreover, the warpage is the height difference Δd between the inner diameter surface 227 and the outer diameter surface 224 along the direction parallel to the optical axis X.

In FIGS. 2C and 2F, the height compensation structure 228, in order from the outer diameter surface 224 of the light blocking sheet 220 to the central opening 226, can include a first side wall 228a and a second side wall 228b. The first side wall 228a extends from one of the object-side outer surface 221 and the image-side outer surface 222 to away from the other one of the object-side outer surface 221 and the image-side outer surface 222. The second side wall 228b extends from the one of the object-side outer surface 221 and the image-side outer surface 222 to close to the other one of the object-side outer surface 221 and the image-side outer surface 222. In detail, the first side wall 228a, the second side wall 228b and the inner diameter surface 227 are disposed in order from the outer diameter portion 223 of the light blocking sheet 220 to the central opening 226. Therefore, it is favorable for decreasing a failure possibility of the light blocking sheet 220 by providing an intrinsic strength over a material itself.

The light blocking sheet 220 can be made of a metal material, and an appearance of the light blocking sheet 220 is black, but is not limited thereto.

The central opening 226 of the light blocking sheet 220 can be an aperture stop of the imaging optical element set. Therefore, a characteristic of the aperture stop can be more stable, and an optical specification and an imaging performance of the imaging optical element set are much less susceptible to surroundings.

In FIGS. 2A and 2C, according to the 2nd example, when the maximum height of the height compensation structure 228 is H, furthermore, the height compensation structure 228 extends from the object side of the imaging optical element set, the maximum height is from the image-side outer surface 222 to a top of the height compensation structure 228, the height difference between the inner diameter surface 227 and the outer diameter surface 224 along the direction parallel to the optical axis X is Δd, a thickness of the light blocking sheet 220 is s, the following conditions of the Table 2 are satisfied.

TABLE 2

| 2nd example | |
|---|---|
| H (mm) | 0.067 |
| Δd (mm) (suffering the compression stress) | 0.0197 |
| Δd (mm) (suffering the compression stress and the baking process) | 0.0062 |
| Δd/H (suffering the compression stress) | 0.294 |
| Δd/H (suffering the compression stress and the baking process) | 0.093 |
| s (mm) | 0.023 |
| H/s | 2.913 |

3rd Example

Figure 3A:
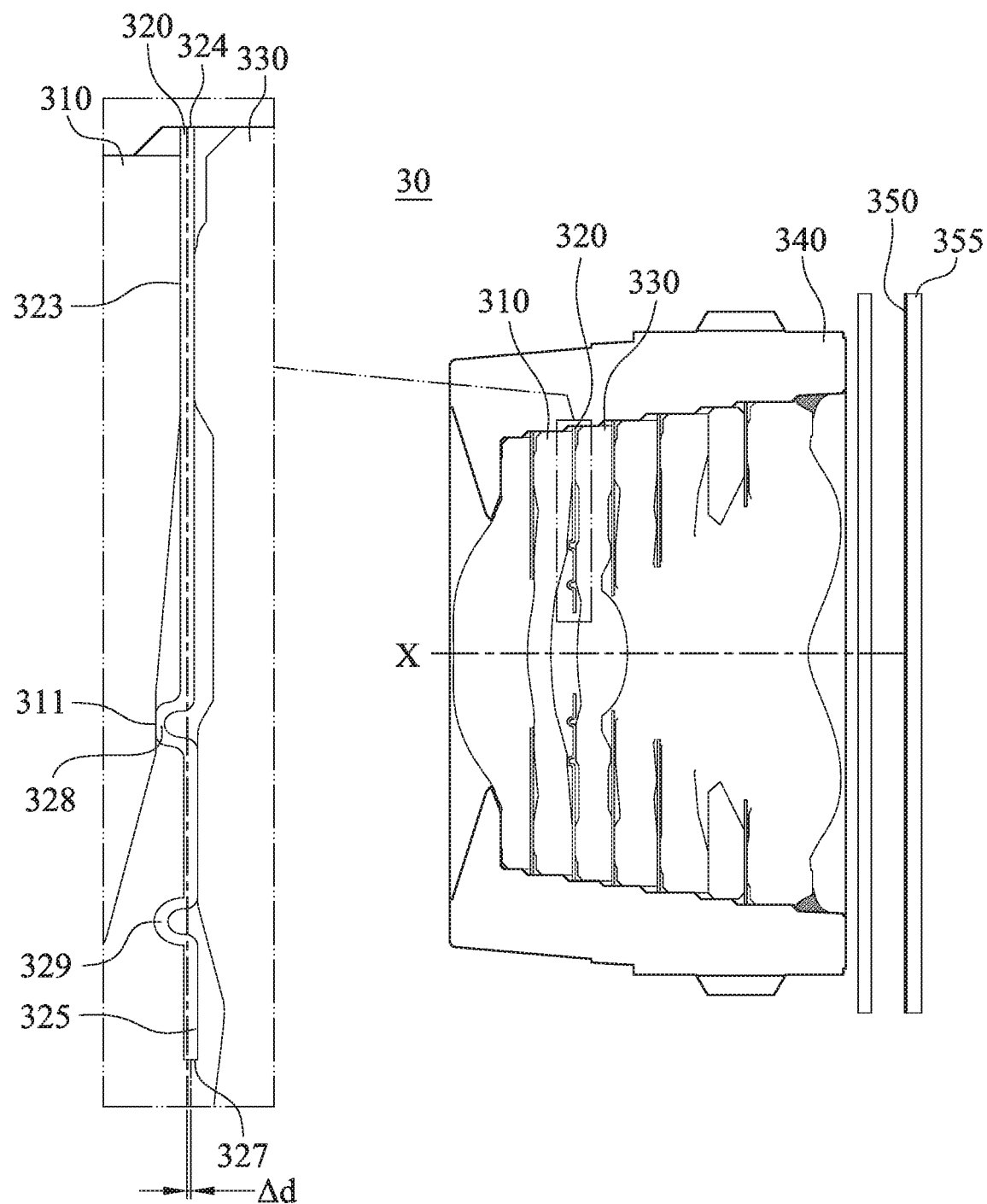
FIG. 3A is a schematic view of an electronic device according to the 3rd example of the present disclosure, wherein an imaging lens assembly of the electronic device is performed without a baking process.
Figure 3B:
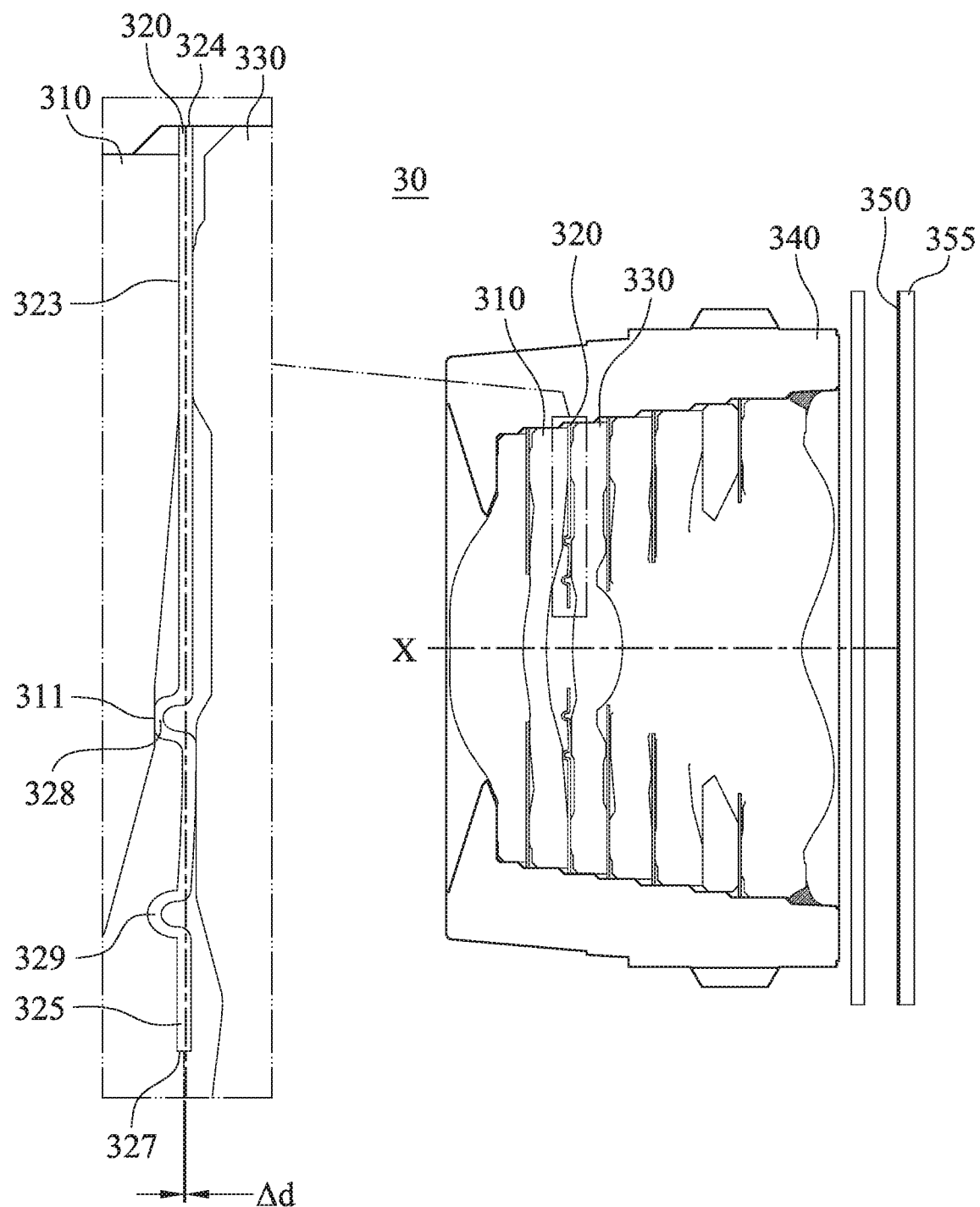
FIG. 3B is another schematic view of the electronic device according to the 3rd example in FIG. 3A, wherein the imaging lens assembly of the electronic device is performed with the baking process.

FIG. 3A is a schematic view of an electronic device 30 according to the 3rd example of the present disclosure, wherein an imaging lens assembly of the electronic device 30 is performed without a baking process. FIG. 3B is another schematic view of the electronic device 30 according to the 3rd example in FIG. 3A, wherein the imaging lens assembly of the electronic device 30 is performed with the baking process. In FIGS. 3A and 3B, the electronic device 30 includes the imaging lens assembly (its reference numeral is omitted) and an image sensor 355. The image sensor 355 is disposed on an image surface 350 of the imaging lens assembly. The imaging lens assembly includes a lens barrel 340 and an imaging optical element set (its reference numeral is omitted). The imaging optical element set is disposed in the lens barrel 340, and a central opening 326 of the light blocking sheet 320 of the imaging optical element set is corresponding to a minimum central opening (its reference numeral is omitted) of the lens barrel 340. Therefore, it is favorable for providing a necessary condition for the imaging lens assembly to block a non-imaging light, a suitable light blocking sheet is provided according to an assembling process condition of the imaging lens assembly.

In detail, the imaging optical element set has an optical axis X, and includes at least one object-side lens element, at least one image-side lens element and at least one light blocking sheet. According to the 3rd example, the light blocking sheet 320 is interposed between the object-side lens element 310 and the image-side lens element 330. Furthermore, the object-side lens element 310, the light blocking sheet 320 and the image-side lens element 330 are disposed in order from an object side to an image side. The imaging optical element set further includes a plurality of lens elements, wherein the lens elements can be disposed according to different imaging demands, and the structures, the surface shapes and so on are not important to the present disclosure, and will not disclose details thereof herein.

Figure 3C:
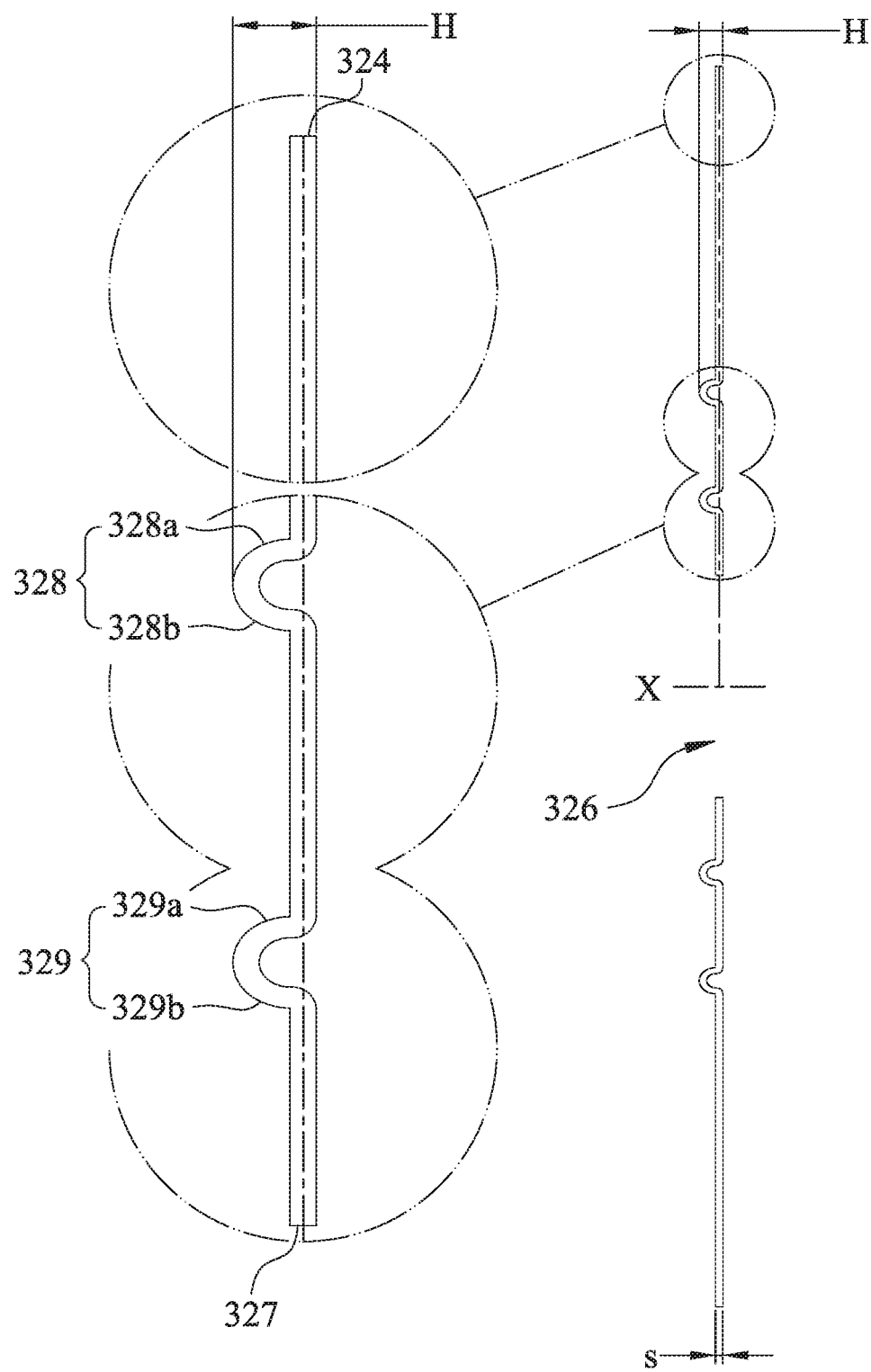
FIG. 3C is a schematic view of the light blocking sheet according to the 3rd example in FIG. 3A.
Figure 3D:
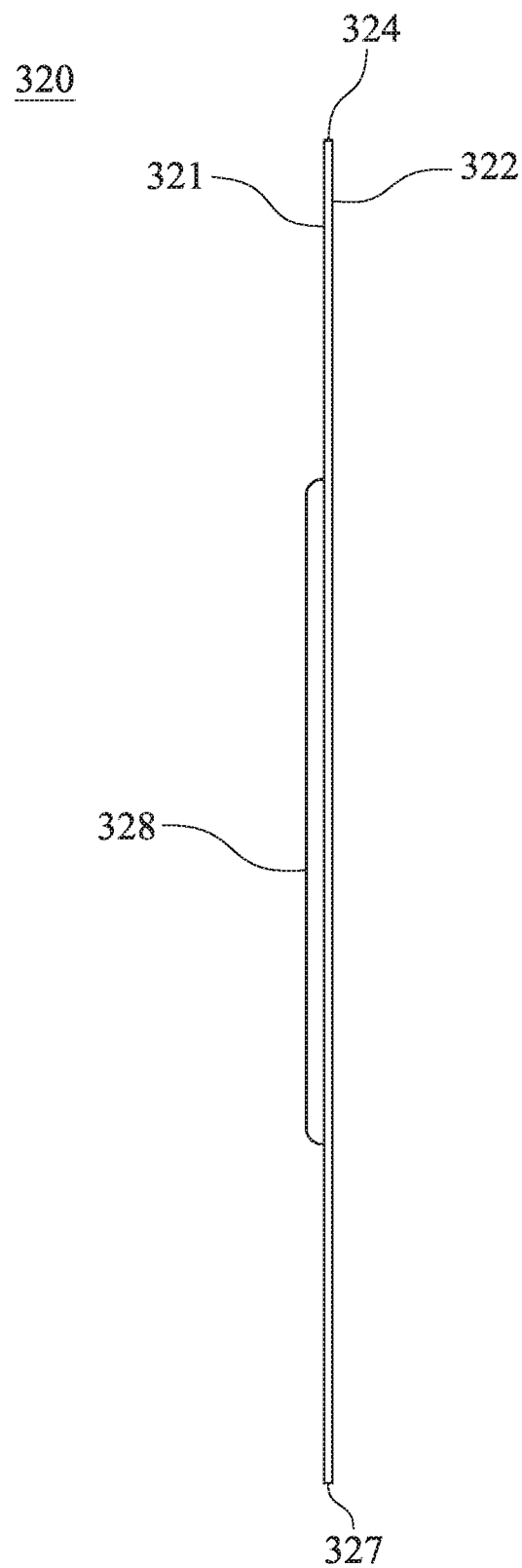
FIG. 3D is a side view of the light blocking sheet according to the 3rd example in FIG. 3A.
Figure 3E:
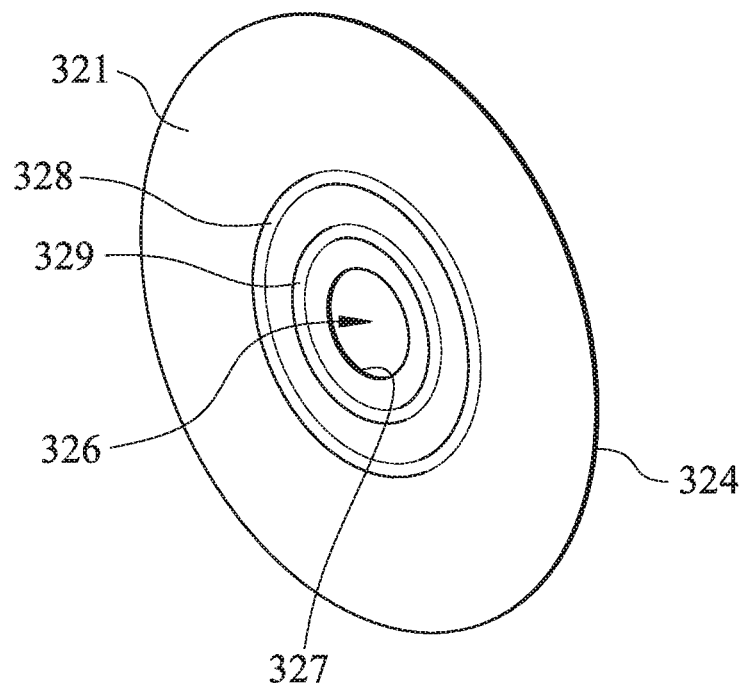
FIG. 3E is a schematic view of an object-side outer surface of the light blocking sheet according to the 3rd example in FIG. 3A.
Figure 3F:
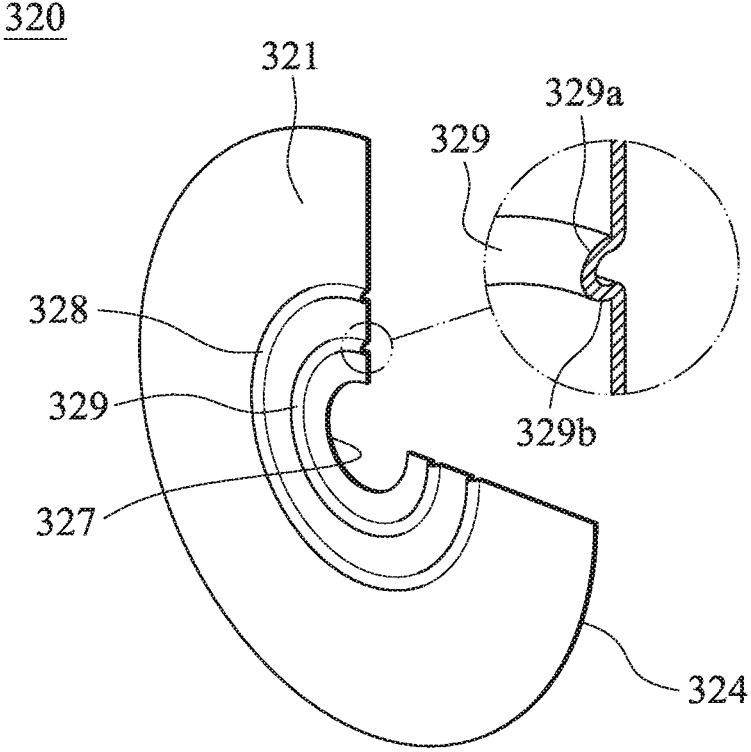
FIG. 3F is a partially cross-sectional view of the light blocking sheet according to the 3rd example in FIG. 3A.
Figure 3G:
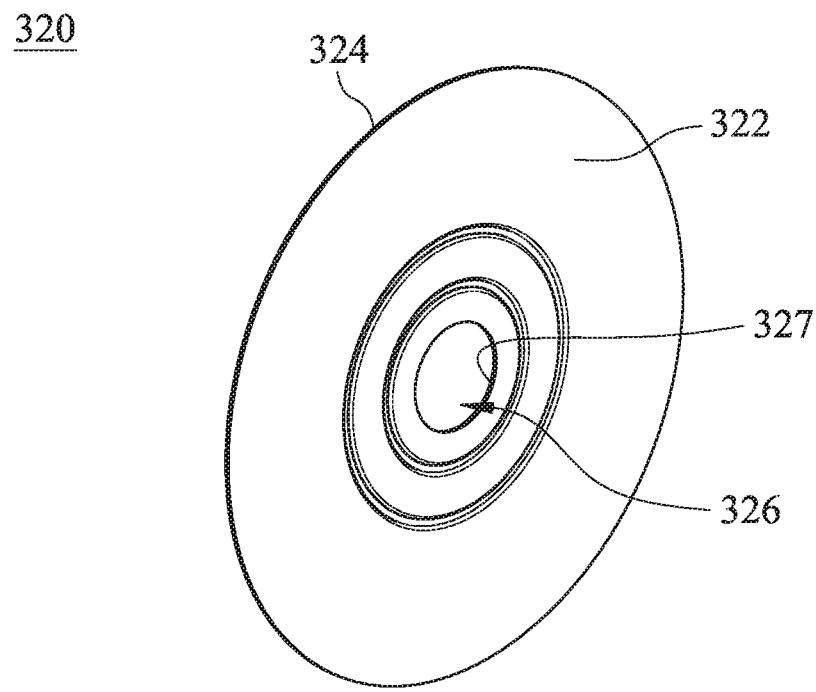
FIG. 3G is a schematic view of an image-side outer surface of the light blocking sheet according to the 3rd example in FIG. 3A.
Figure 3H:
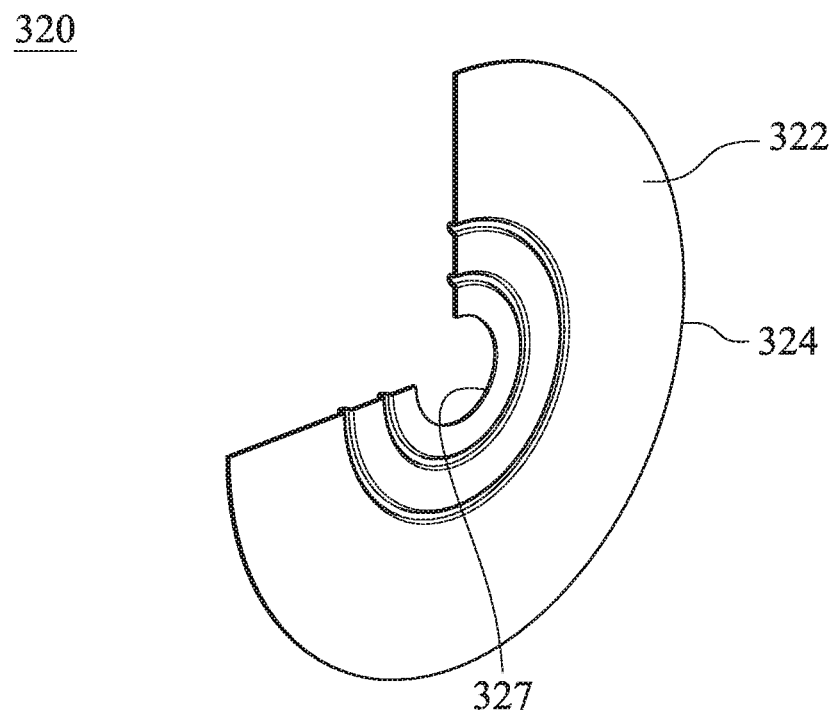
FIG. 3H is another partially cross-sectional view of the light blocking sheet according to the 3rd example in FIG. 3A.

FIG. 3C is a schematic view of the light blocking sheet 320 according to the 3rd example in FIG. 3A. FIG. 3D is a side view of the light blocking sheet 320 according to the 3rd example in FIG. 3A. FIG. 3E is a schematic view of an object-side outer surface 321 of the light blocking sheet 320 according to the 3rd example in FIG. 3A. FIG. 3F is a partially cross-sectional view of the light blocking sheet 320 according to the 3rd example in FIG. 3A. FIG. 3G is a schematic view of an image-side outer surface 322 of the light blocking sheet 320 according to the 3rd example in FIG. 3A. FIG. 3H is another partially cross-sectional view of the light blocking sheet 320 according to the 3rd example in FIG. 3A. In FIGS. 3C to 3H, the light blocking sheet 320 includes the object-side outer surface 321, the image-side outer surface 322, an outer diameter portion 323, an inner diameter portion 325 and two height compensation structures 328, 329.

The object-side outer surface 321 is toward an object side of the imaging optical element set, and the image-side outer surface 322 is opposite to the object-side outer surface 321. The outer diameter portion 323 has an outer diameter surface 324 connected to the object-side outer surface 321 and the image-side outer surface 322. The inner diameter portion 325 defines the central opening 326 of the light blocking sheet 320, and has an inner diameter surface 327 connected to the object-side outer surface 321 and the image-side outer surface 322.

The height compensation structures 328, 329 are in full circle form, surrounds the central opening 326, and for adjusting a height difference between the inner diameter surface 327 and the outer diameter surface 324 along a direction parallel to the optical axis X. Therefore, it is favorable for promoting an applicable range of the height compensation structures 328, 329, and it is also favorable for controlling a warpage of the inner diameter portion 325 to decrease an excessive warpage or an excessive correction.

In detail, in FIGS. 3A and 3B, the height compensation structure 328 can be directly contacted with an adjacent lens element, and the lens element adjacent to the height compensation structure 328 can include a full circle form structure surface 311 for corresponding to and being directly contacted with the height compensation structure 328. Via a space arrangement of the lens element, a supporting effect of a structure can be further used, and an ability of improving the warpage and a distortion can be promoted. According to the 3rd example, the height compensation structure 328 is directly contacted with the object-side lens element 310, and the object-side lens element 310 includes the full circle form structure surface 311 for corresponding to and being directly contacted with the height compensation structure 328. Therefore, the supporting stability of the object-side lens element 310 and the height compensation structure 328 can be increased, and it is favorable for controlling a changing trend of the warpage to further promote an accuracy of compensating for the warpage. According to the 3rd example, a warpage of suffering a compression stress is −6.0 μm, a warpage of suffering the compression stress and the baking process is 3.0 μm. Moreover, the warpage is the height difference $\Delta d$ between the inner diameter surface 327 and the outer diameter surface 324 along the direction parallel to the optical axis X.

In FIGS. 3C and 3F, the height compensation structure 328, in order from the outer diameter surface 324 of the light blocking sheet 320 to the central opening 326, can include a first side wall 328$a$ and a second side wall 328$b$, and the height compensation structure 329, in order from the outer diameter surface 324 of the light blocking sheet 320 to the central opening 326, can include a first side wall 329$a$ and a second side wall 329$b$. The first side walls 328$a$, 329$a$ extend from one of the object-side outer surface 321 and the image-side outer surface 322 to away from the other one of the object-side outer surface 321 and the image-side outer surface 322. The second side walls 328$b$, 329$b$ extend from the one of the object-side outer surface 321 and the image-side outer surface 322 to close to the other one of the object-side outer surface 321 and the image-side outer surface 322. In detail, the first side wall 328$a$, the second side wall 328$b$, the first side wall 329$a$, the second side wall 329$b$ and the inner diameter surface 327 are disposed in order from the outer diameter portion 323 of the light blocking sheet 320 to the central opening 326. Therefore, it is favorable for decreasing a failure possibility of the light blocking sheet 320 by providing an intrinsic strength over a material itself.

The light blocking sheet 320 can be made of a metal material, and an appearance of the light blocking sheet 320 is black, but is not limited thereto.

The central opening 326 of the light blocking sheet 320 can be an aperture stop of the imaging optical element set. Therefore, a characteristic of the aperture stop can be more stable, and an optical specification and an imaging performance of the imaging optical element set are much less susceptible to surroundings.

In FIGS. 3A and 3C, according to the 3rd example, when the maximum height of the height compensation structures 328, 329 are H, furthermore, the height compensation structures 328, 329 extend from the object side of the imaging optical element set, the maximum height is from the image-side outer surface 322 to a top of the height compensation structures 328, 329, the height difference between the inner diameter surface 327 and the outer diameter surface 324 along the direction parallel to the optical axis X is $\Delta d$, a thickness of the light blocking sheet 320 is s, the following conditions of the Table 3 are satisfied.

TABLE 3

| 3rd example | |
|---|---|
| H (mm) | 0.073 |
| Δd (mm) (suffering the compression stress) | 0.006 |
| Δd (mm) (suffering the compression stress and the baking process) | 0.003 |
| Δd/H (suffering the compression stress) | 0.082 |
| Δd/H (suffering the compression stress and the baking process) | 0.041 |
| s (mm) | 0.023 |
| H/s | 3.174 |

4th Example

Figure 4A:
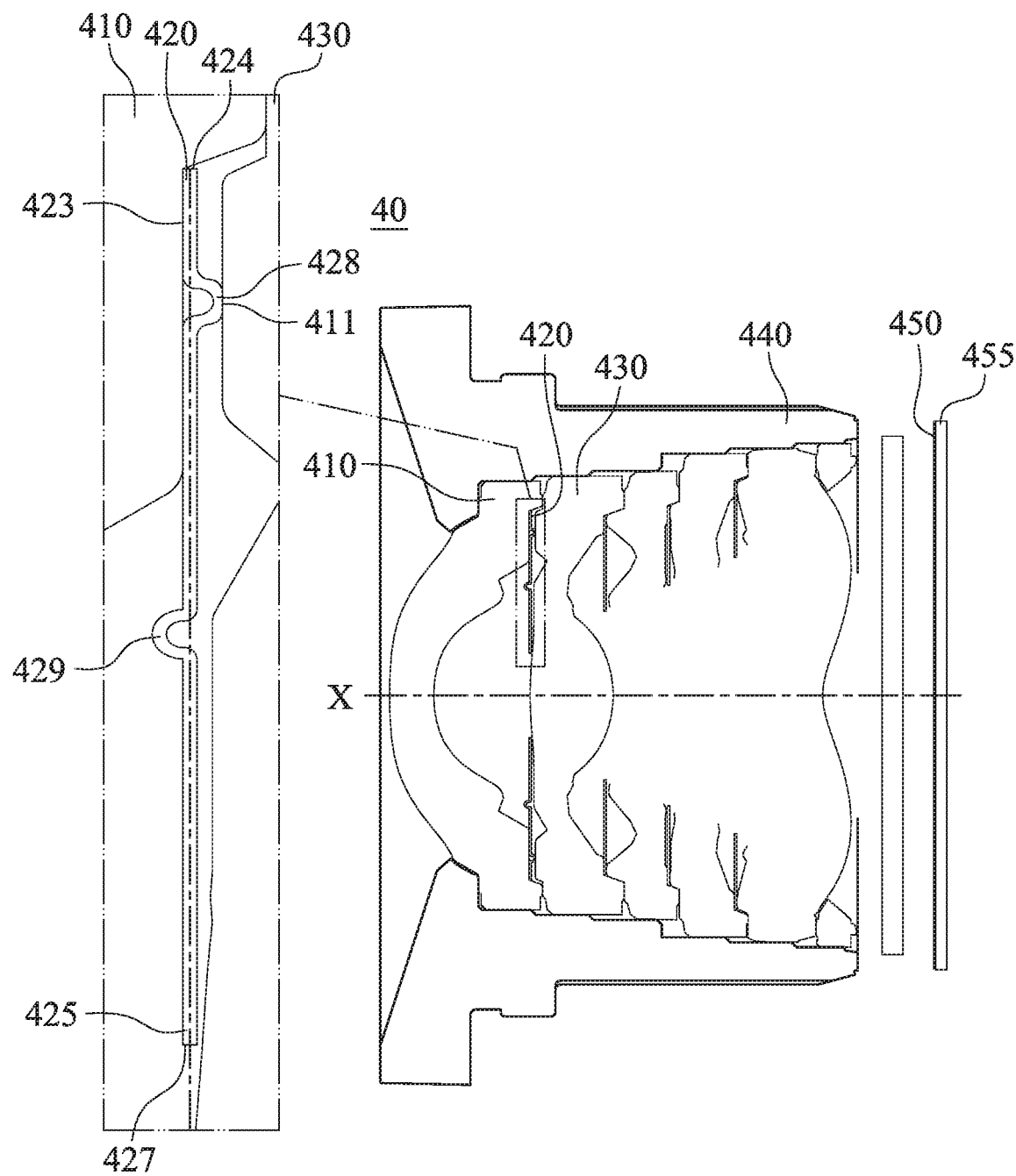
FIG. 4A is a schematic view of an electronic device according to the 4th example of the present disclosure, wherein an imaging lens assembly of the electronic device is performed without a baking process.
Figure 4B:
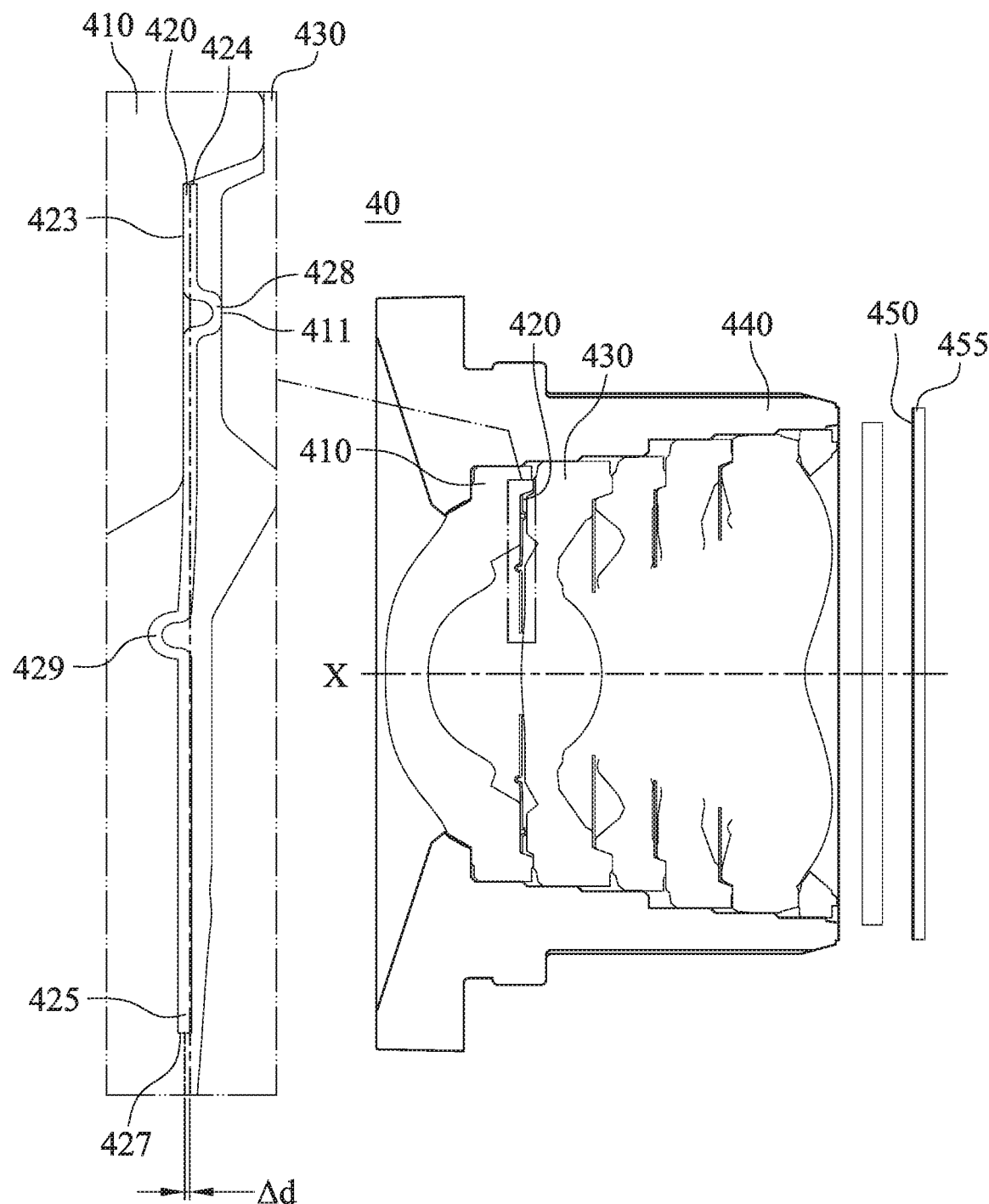
FIG. 4B is another schematic view of the electronic device according to the 4th example in FIG. 4A, wherein the imaging lens assembly of the electronic device is performed with the baking process.

FIG. 4A is a schematic view of an electronic device 40 according to the 4th example of the present disclosure, wherein an imaging lens assembly of the electronic device 40 is performed without a baking process. FIG. 4B is another schematic view of the electronic device 40 according to the 4th example in FIG. 4A, wherein the imaging lens assembly of the electronic device 40 is performed with the baking process. In FIGS. 4A and 4B, the electronic device 40 includes the imaging lens assembly (its reference numeral is omitted) and an image sensor 455. The image sensor 455 is disposed on an image surface 450 of the imaging lens assembly. The imaging lens assembly includes a lens barrel 440 and an imaging optical element set (its reference numeral is omitted). The imaging optical element set is disposed in the lens barrel 440, and a central opening 426 of the light blocking sheet 420 of the imaging optical element set is corresponding to a minimum central opening (its reference numeral is omitted) of the lens barrel 440. Therefore, it is favorable for providing a necessary condition for the imaging lens assembly to block a non-imaging light, a suitable light blocking sheet is provided according to an assembling process condition of the imaging lens assembly.

In detail, the imaging optical element set has an optical axis X, and includes at least one object-side lens element, at least one image-side lens element and at least one light blocking sheet. According to the 4th example, the light blocking sheet 420 is interposed between the object-side lens element 410 and the image-side lens element 430. Furthermore, the object-side lens element 410, the light blocking sheet 420 and the image-side lens element 430 are disposed in order from an object side to an image side. The imaging optical element set further includes a plurality of lens elements, wherein the lens elements can be disposed according to different imaging demands, and the structures, the surface shapes and so on are not important to the present disclosure, and will not disclose details thereof herein.

Figure 4C:
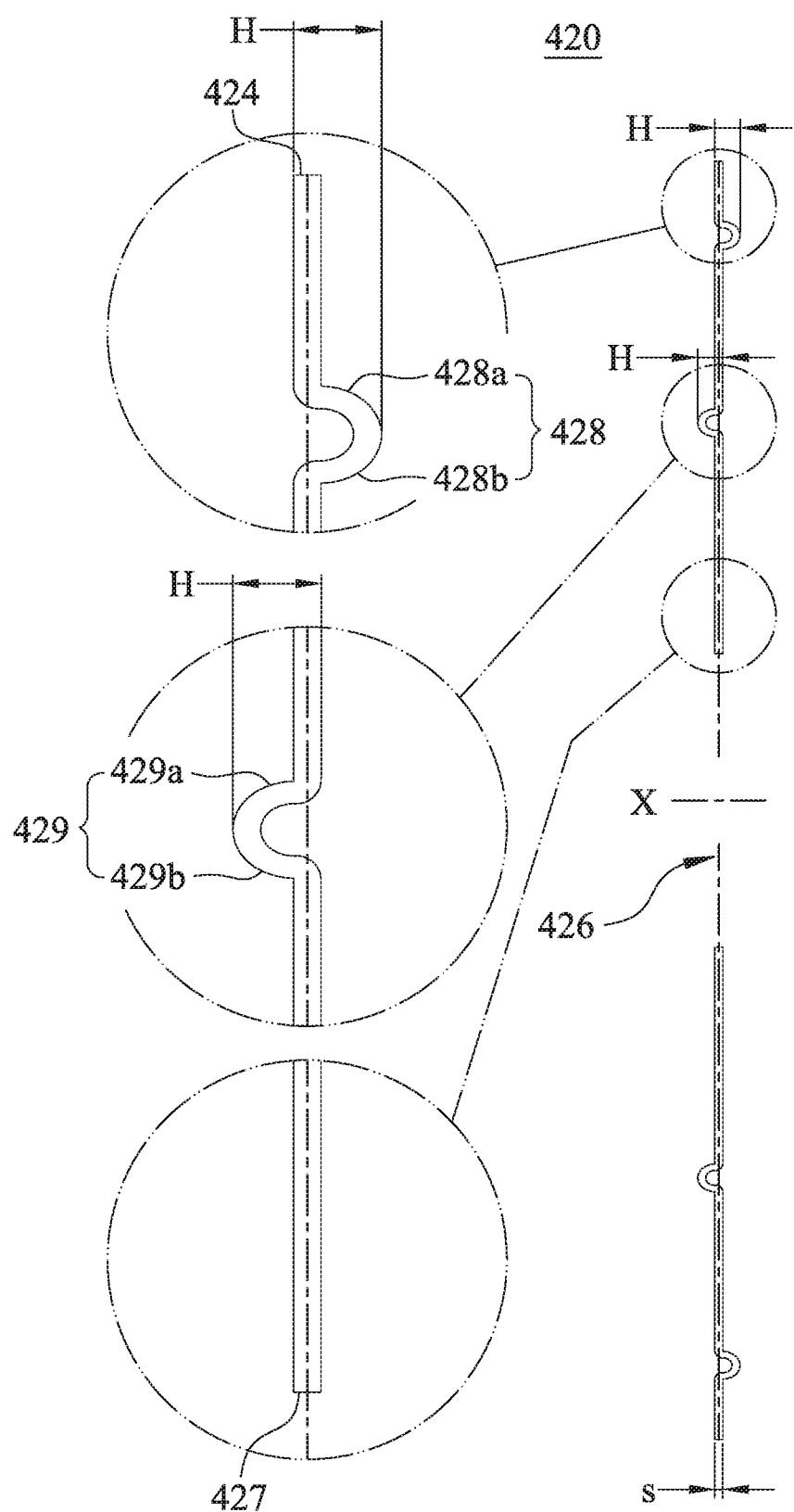
FIG. 4C is a schematic view of the light blocking sheet according to the 4th example in FIG. 4A.
Figure 4D:
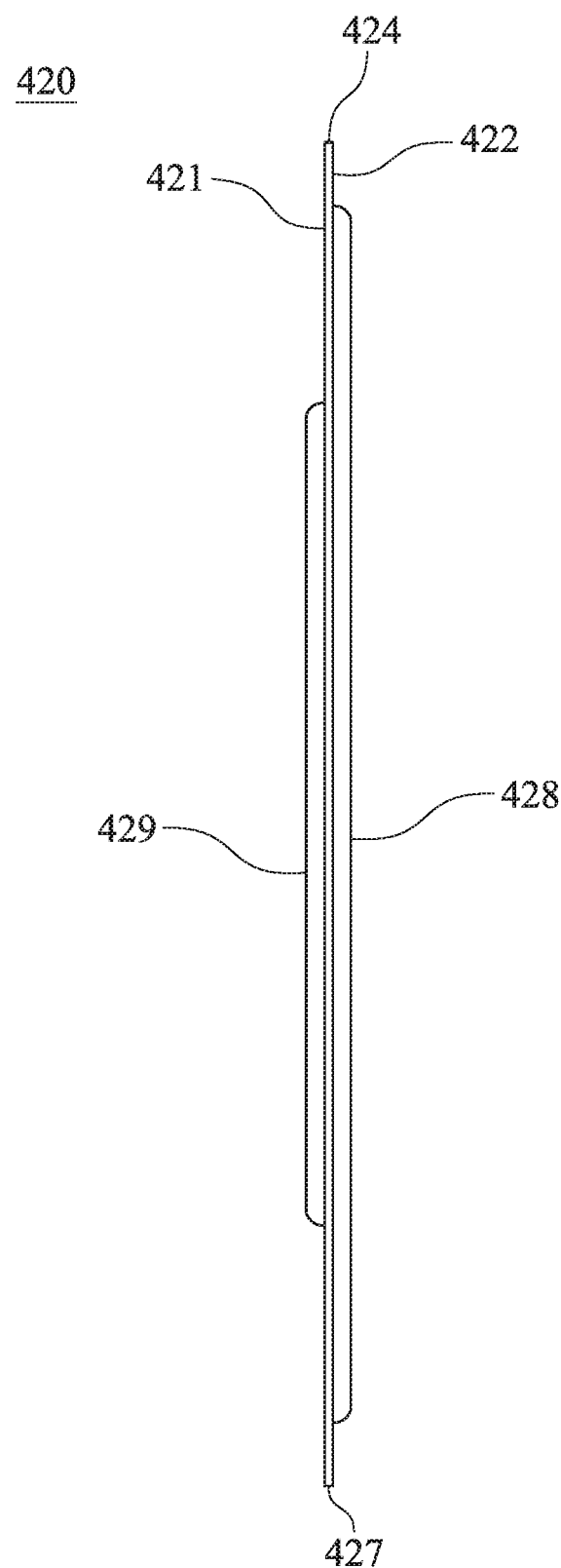
FIG. 4D is a side view of the light blocking sheet according to the 4th example in FIG. 4A.
Figure 4E:
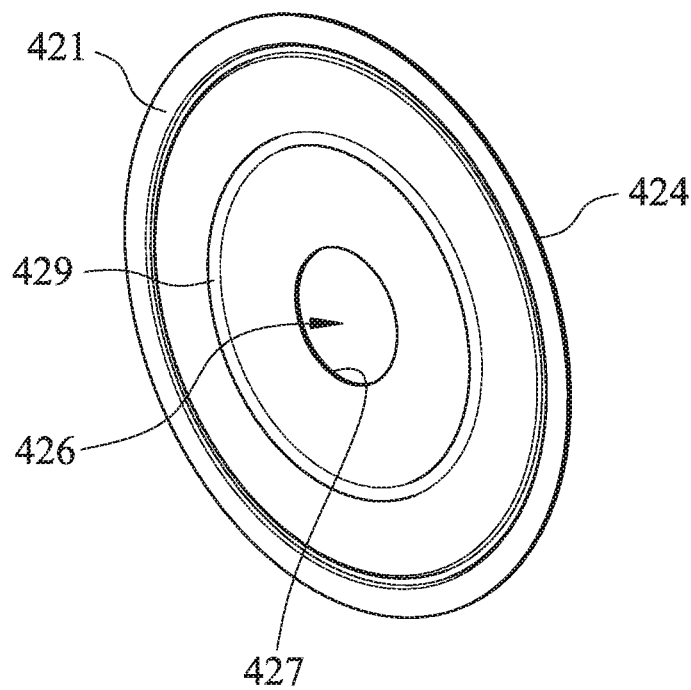
FIG. 4E is a schematic view of an object-side outer surface of the light blocking sheet according to the 4th example in FIG. 4A.
Figure 4F:
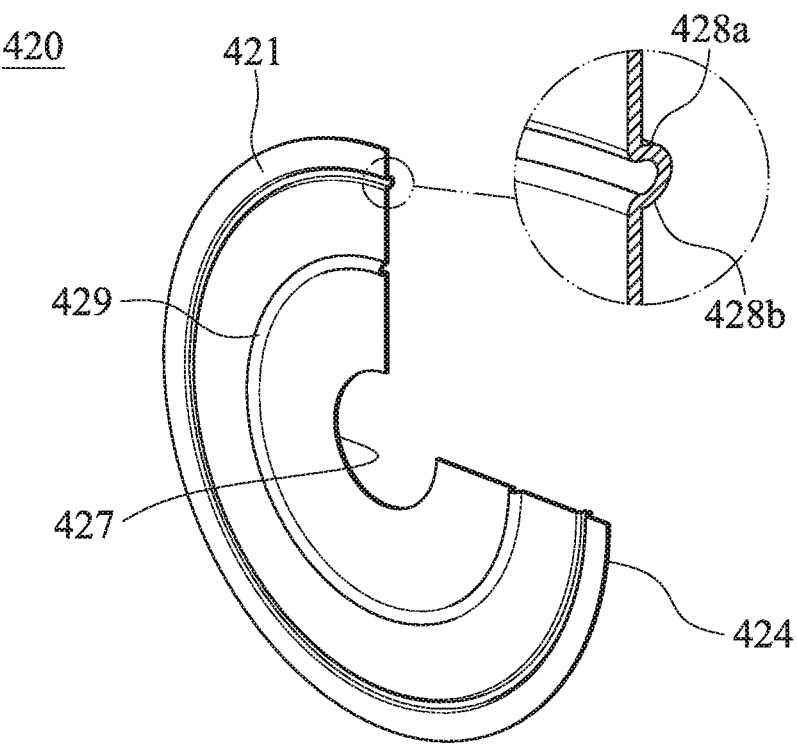
FIG. 4F is a partially cross-sectional view of the light blocking sheet according to the 4th example in FIG. 4A.
Figure 4G:
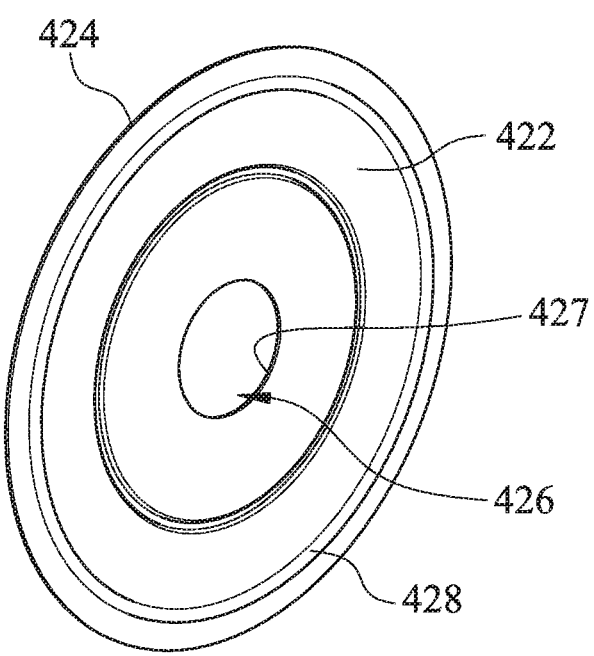
FIG. 4G is a schematic view of an image-side outer surface of the light blocking sheet according to the 4th example in FIG. 4A.
Figure 4H:
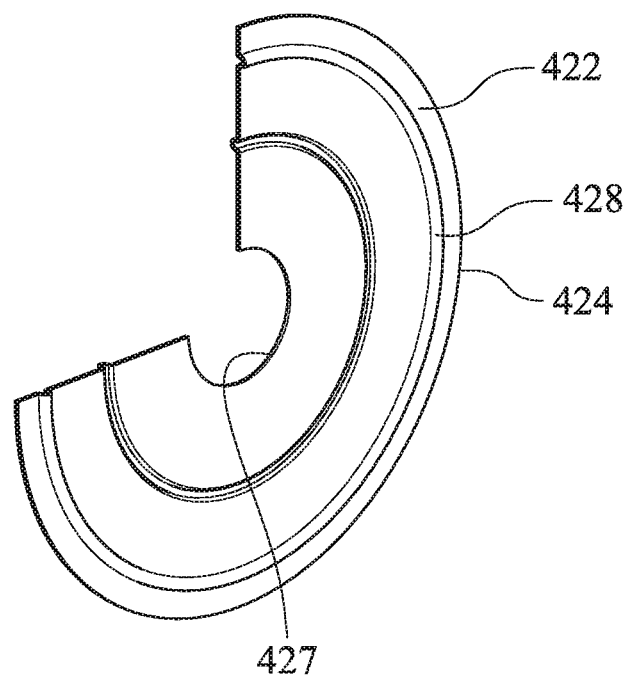
FIG. 4H is another partially cross-sectional view of the light blocking sheet according to the 4th example in FIG. 4A.

FIG. 4C is a schematic view of the light blocking sheet 420 according to the 4th example in FIG. 4A. FIG. 4D is a side view of the light blocking sheet 420 according to the 4th example in FIG. 4A. FIG. 4E is a schematic view of an object-side outer surface 421 of the light blocking sheet 420 according to the 4th example in FIG. 4A. FIG. 4F is a partially cross-sectional view of the light blocking sheet 420 according to the 4th example in FIG. 4A. FIG. 4G is a schematic view of an image-side outer surface 422 of the light blocking sheet 420 according to the 4th example in FIG. 4A. FIG. 4H is another partially cross-sectional view of the light blocking sheet 420 according to the 4th example in FIG. 4A. In FIGS. 4C to 4H, the light blocking sheet 420 includes the object-side outer surface 421, the image-side outer surface 422, an outer diameter portion 423, an inner diameter portion 425 and two height compensation structures 428, 429.

The object-side outer surface 421 is toward an object side of the imaging optical element set, and the image-side outer surface 422 is opposite to the object-side outer surface 421. The outer diameter portion 423 has an outer diameter surface 424 connected to the object-side outer surface 421 and the image-side outer surface 422. The inner diameter portion 425 defines the central opening 426 of the light blocking sheet 420, and has an inner diameter surface 427 connected to the object-side outer surface 421 and the image-side outer surface 422.

The height compensation structures 428, 429 are in full circle form, surrounds the central opening 426, and for adjusting a height difference between the inner diameter surface 427 and the outer diameter surface 424 along a direction parallel to the optical axis X. Therefore, it is favorable for promoting an applicable range of the height compensation structures 428, 429, and it is also favorable for controlling a warpage of the inner diameter portion 425 to decrease an excessive warpage or an excessive correction.

In detail, in FIGS. 4A and 4B, the height compensation structure 428 can be directly contacted with an adjacent lens element, and the lens element adjacent to the height compensation structure 428 can include a full circle form structure surface 411 for corresponding to and being directly contacted with the height compensation structure 428. Via a space arrangement of the lens element, a supporting effect of a structure can be further used, and an ability of improving the warpage and a distortion can be promoted. According to the 4th example, the height compensation structure 428 is directly contacted with the image-side lens element 430, and the image-side lens element 430 includes the full circle form structure surface 411 for corresponding to and being directly contacted with the height compensation structure 428. Therefore, the supporting stability of the image-side lens element 430 and the height compensation structure 428 can be increased, and it is favorable for controlling a changing trend of the warpage to further promote an accuracy of compensating for the warpage. According to the 4th example, a warpage of suffering a compression stress is 0.0 μm, a warpage of suffering the compression stress and the baking process is 9.0 μm. Moreover, the warpage is the height difference Δd between the inner diameter surface 427 and the outer diameter surface 424 along the direction parallel to the optical axis X.

In FIGS. 4C and 4F, the height compensation structure 428, in order from the outer diameter surface 424 of the light blocking sheet 420 to the central opening 426, can include a first side wall 428a and a second side wall 428b, and the height compensation structure 429, in order from the outer diameter surface 424 of the light blocking sheet 420 to the central opening 426, can include a first side wall 429a and a second side wall 429b. The first side walls 428a, 429a extend from one of the object-side outer surface 421 and the image-side outer surface 422 to away from the other one of the object-side outer surface 421 and the image-side outer surface 422. The second side walls 428b, 429b extend from the one of the object-side outer surface 421 and the image-side outer surface 422 to close to the other one of the object-side outer surface 421 and the image-side outer surface 422. In detail, the first side wall 428a, the second side wall 428b, the first side wall 429a, the second side wall 429b and the inner diameter surface 427 are disposed in order from the outer diameter portion 423 of the light blocking sheet 420 to the central opening 426. Therefore, it is favorable for decreasing a failure possibility of the light blocking sheet 420 by providing an intrinsic strength over a material itself.

The light blocking sheet 420 can be made of a metal material, and an appearance of the light blocking sheet 420 is black, but is not limited thereto.

The central opening 426 of the light blocking sheet 420 can be an aperture stop of the imaging optical element set. Therefore, a characteristic of the aperture stop can be more stable, and an optical specification and an imaging performance of the imaging optical element set are much less susceptible to surroundings.

In FIGS. 4A and 4C, according to the 4th example, when the maximum height of the height compensation structures 428, 429 are H, the height difference between the inner diameter surface 427 and the outer diameter surface 424 along the direction parallel to the optical axis X is Δd, a thickness of the light blocking sheet 420 is s, the following conditions of the Table 4 are satisfied.

TABLE 4

4th example

| | |
|---|---|
| H (mm) | 0.073 |
| Δd (mm) (suffering the compression stress) | 0 |
| Δd (mm) (suffering the compression stress and the baking process) | 0.009 |
| Δd/H (suffering the compression stress) | 0 |
| Δd/H (suffering the compression stress and the baking process) | 0.123 |
| s (mm) | 0.023 |
| H/s | 3.174 |

5th Example

Figure 5A:
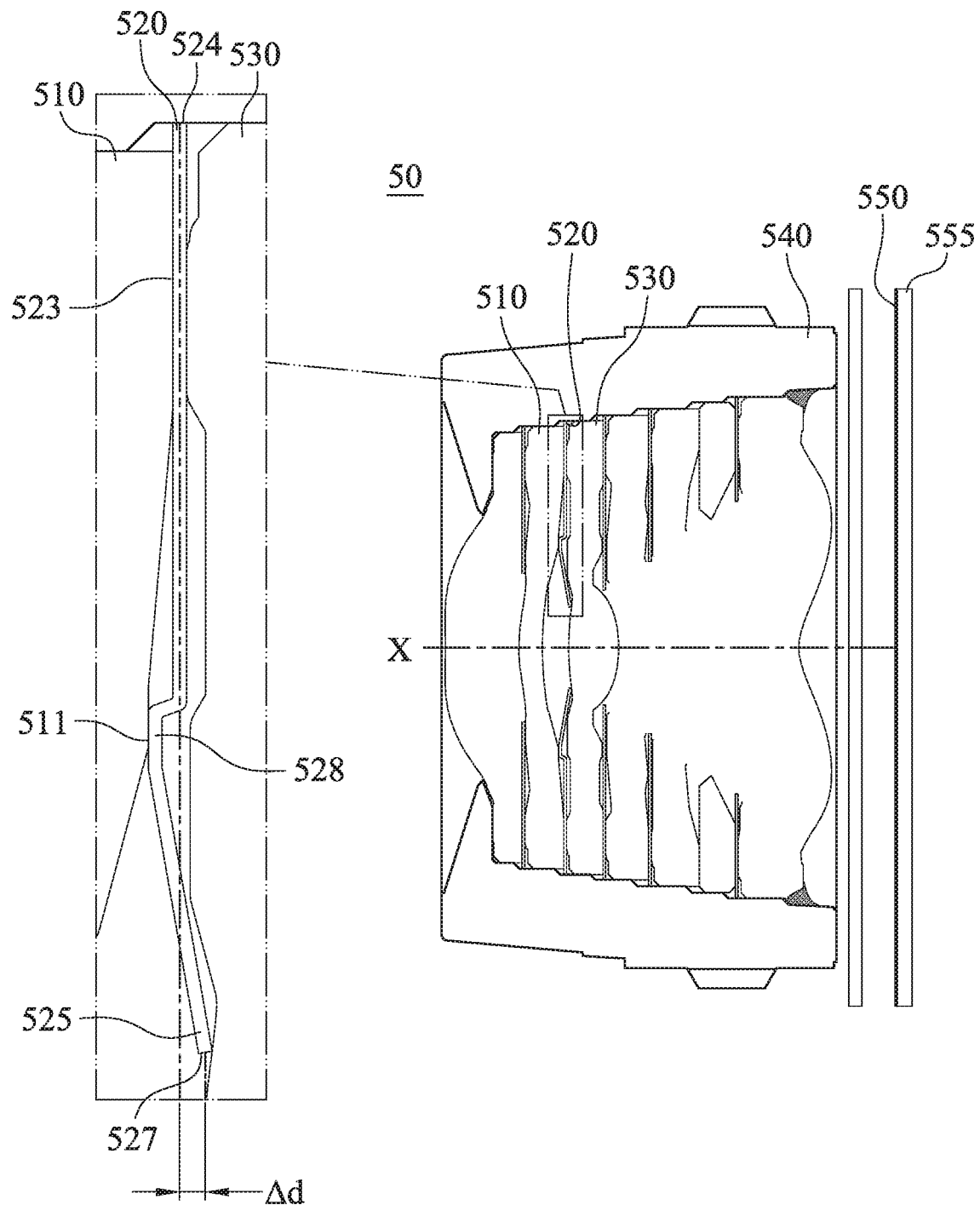
FIG. 5A is a schematic view of an electronic device according to the 5th example of the present disclosure, wherein an imaging lens assembly of the electronic device is performed without a baking process.
Figure 5B:
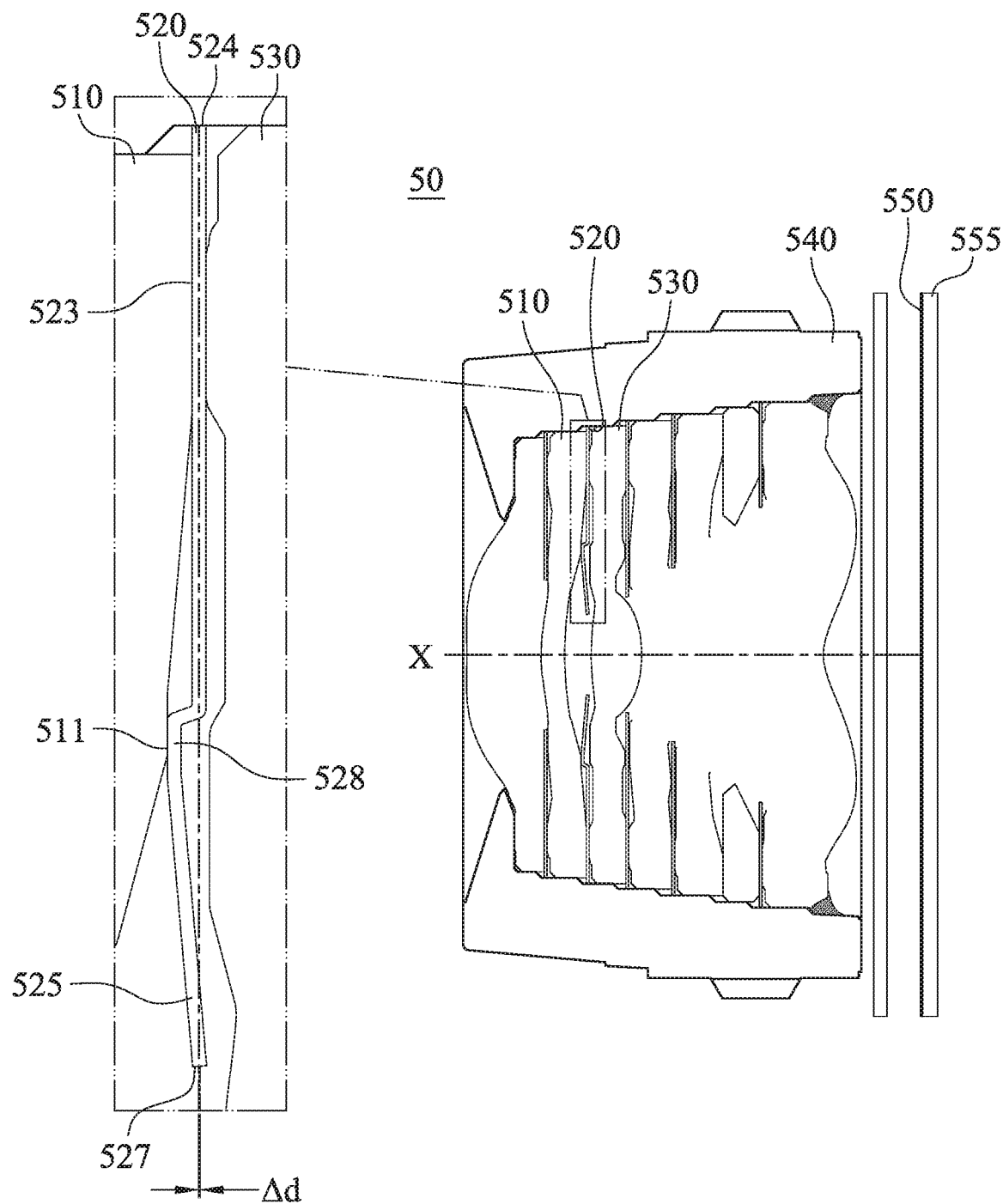
FIG. 5B is another schematic view of the electronic device according to the 5th example in FIG. 5A, wherein the imaging lens assembly of the electronic device is performed with the baking process.

FIG. 5A is a schematic view of an electronic device 50 according to the 5th example of the present disclosure, wherein an imaging lens assembly of the electronic device 50 is performed without a baking process. FIG. 5B is another schematic view of the electronic device 50 according to the 5th example in FIG. 5A, wherein the imaging lens assembly of the electronic device 50 is performed with the baking process. In FIGS. 5A and 5B, the electronic device 50 includes the imaging lens assembly (its reference numeral is omitted) and an image sensor 555. The image sensor 555 is disposed on an image surface 550 of the imaging lens assembly. The imaging lens assembly includes a lens barrel 540 and an imaging optical element set (its reference numeral is omitted). The imaging optical element set is disposed in the lens barrel 540, and a central opening 526 of the light blocking sheet 520 of the imaging optical element set is corresponding to a minimum central opening (its reference numeral is omitted) of the lens barrel 540. Therefore, it is favorable for providing a necessary condition for the imaging lens assembly to block a non-imaging light, a suitable light blocking sheet is provided according to an assembling process condition of the imaging lens assembly.

In detail, the imaging optical element set has an optical axis X, and includes at least one object-side lens element, at least one image-side lens element and at least one light blocking sheet. According to the 5th example, the light blocking sheet 520 is interposed between the object-side lens element 510 and the image-side lens element 530. Furthermore, the object-side lens element 510, the light blocking sheet 520 and the image-side lens element 530 are disposed in order from an object side to an image side. The imaging optical element set further includes a plurality of lens elements, wherein the lens elements can be disposed according to different imaging demands, and the structures, the surface shapes and so on are not important to the present disclosure, and will not disclose details thereof herein.

Figure 5C:
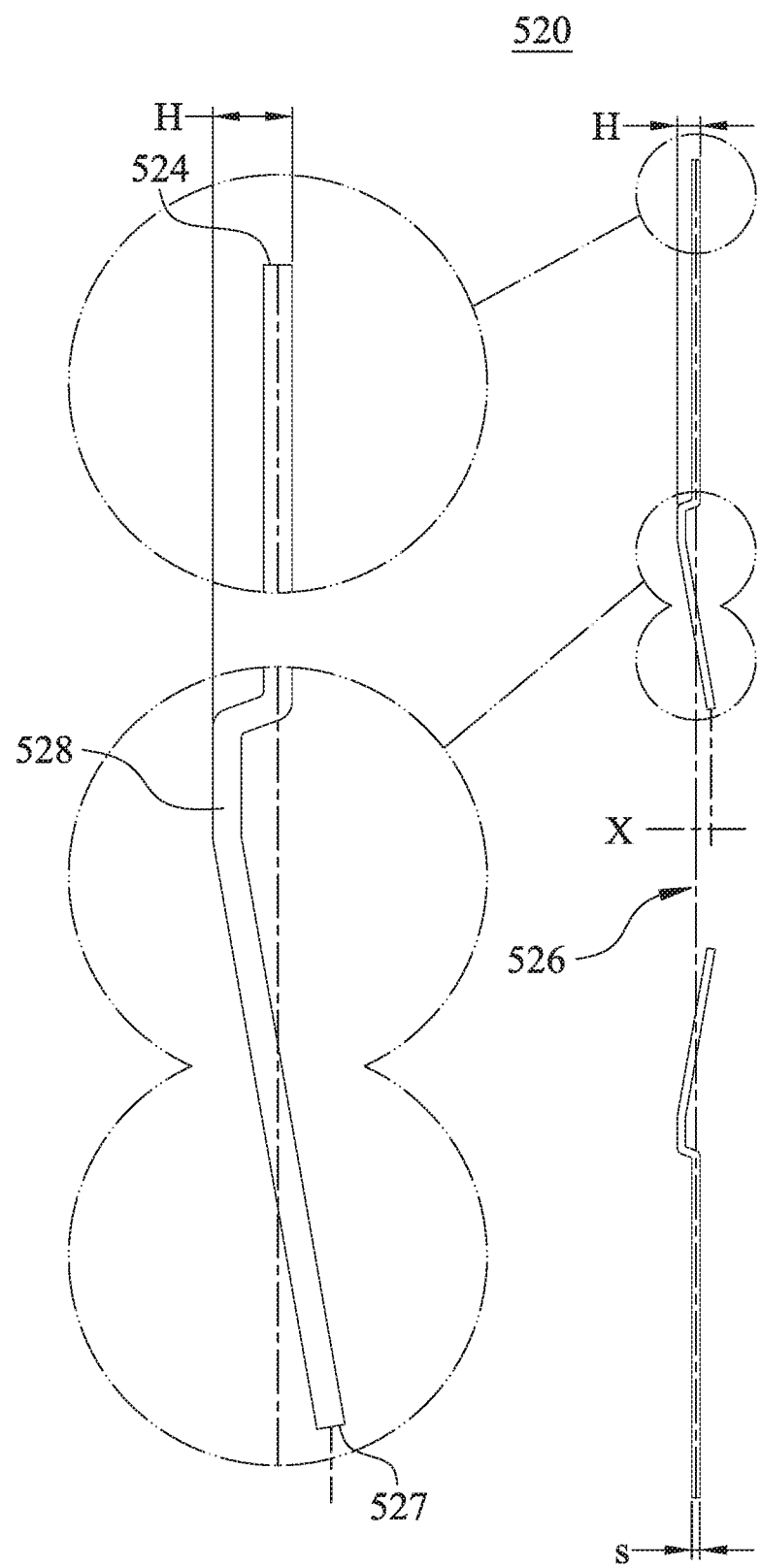
FIG. 5C is a schematic view of the light blocking sheet according to the 5th example in FIG. 5A.
Figure 5D:
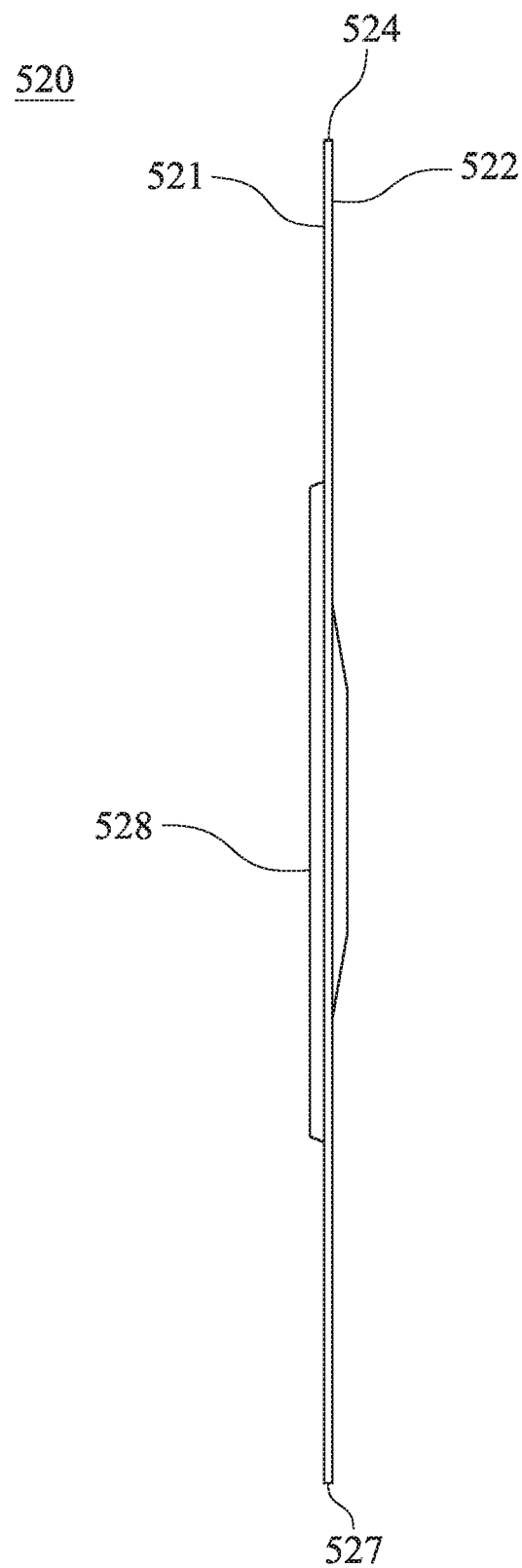
FIG. 5D is a side view of the light blocking sheet according to the 5th example in FIG. 5A.
Figure 5E:
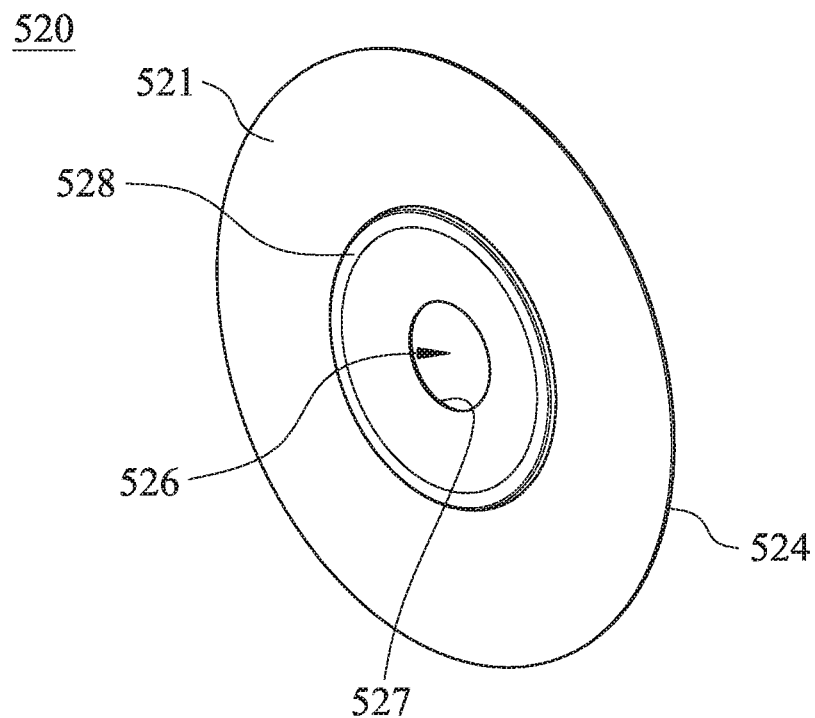
FIG. 5E is a schematic view of an object-side outer surface of the light blocking sheet according to the 5th example in FIG. 5A.
Figure 5F:
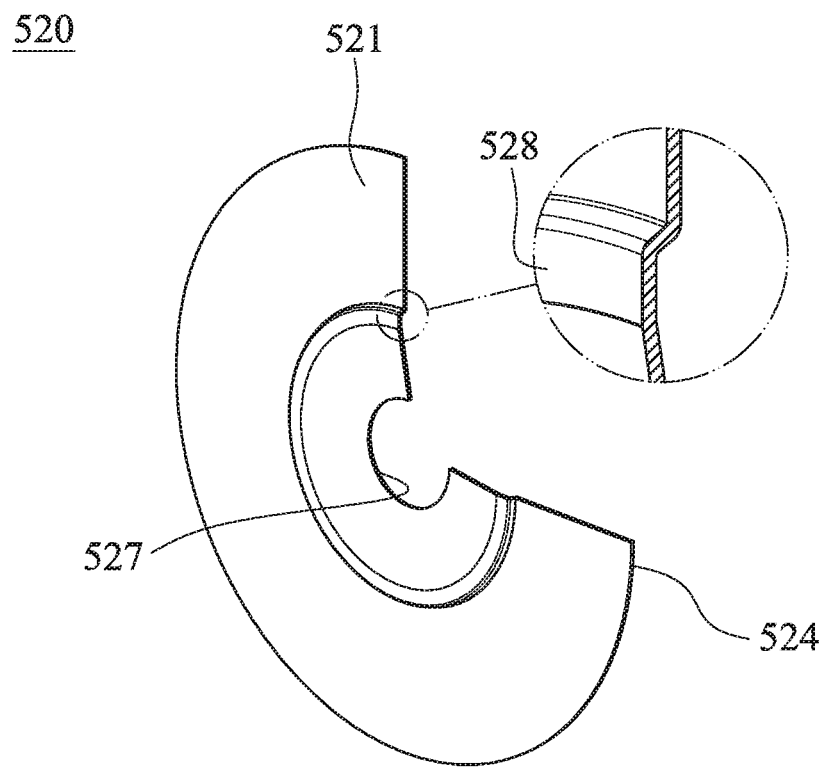
FIG. 5F is a partially cross-sectional view of the light blocking sheet according to the 5th example in FIG. 5A.
Figure 5G:
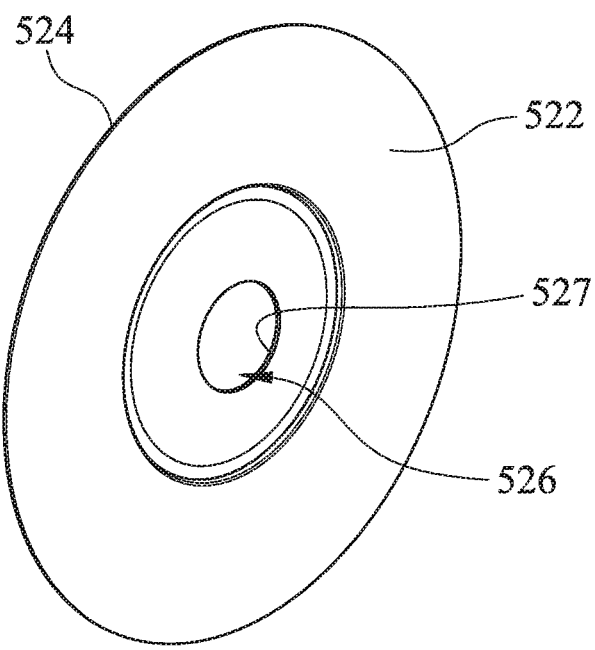
FIG. 5G is a schematic view of an image-side outer surface of the light blocking sheet according to the 5th example in FIG. 5A.
Figure 5H:
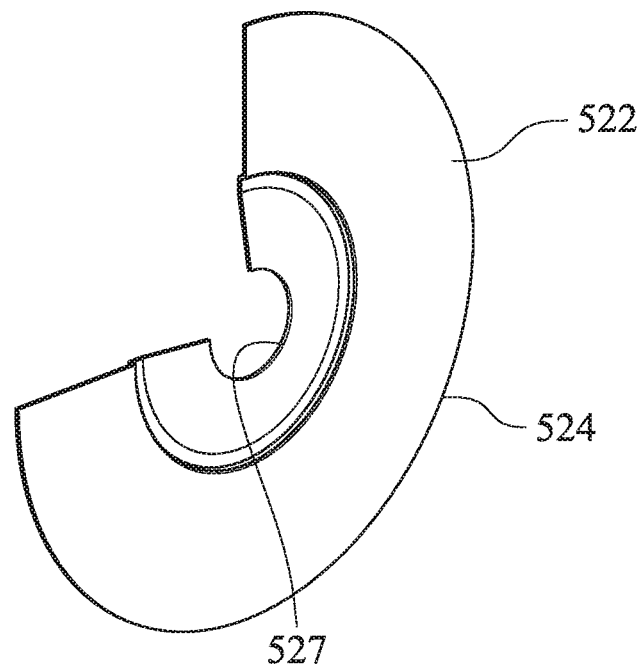
FIG. 5H is another partially cross-sectional view of the light blocking sheet according to the 5th example in FIG. 5A.

FIG. 5C is a schematic view of the light blocking sheet 520 according to the 5th example in FIG. 5A. FIG. 5D is a side view of the light blocking sheet 520 according to the 5th example in FIG. 5A. FIG. 5E is a schematic view of an object-side outer surface 521 of the light blocking sheet 520 according to the 5th example in FIG. 5A. FIG. 5F is a partially cross-sectional view of the light blocking sheet 520 according to the 5th example in FIG. 5A. FIG. 5G is a schematic view of an image-side outer surface 522 of the light blocking sheet 520 according to the 5th example in FIG. 5A. FIG. 5H is another partially cross-sectional view of the light blocking sheet 520 according to the 5th example in FIG. 5A. In FIGS. 5C to 5H, the light blocking sheet 520 includes the object-side outer surface 521, the image-side outer surface 522, an outer diameter portion 523, an inner diameter portion 525 and a height compensation structure 528.

The object-side outer surface 521 is toward an object side of the imaging optical element set, and the image-side outer surface 522 is opposite to the object-side outer surface 521. The outer diameter portion 523 has an outer diameter surface 524 connected to the object-side outer surface 521 and the image-side outer surface 522. The inner diameter portion 525 defines the central opening 526 of the light blocking sheet 520, and has an inner diameter surface 527 connected to the object-side outer surface 521 and the image-side outer surface 522.

The height compensation structure 528 is in full circle form, surrounds the central opening 526, and for adjusting a height difference between the inner diameter surface 527 and the outer diameter surface 524 along a direction parallel to the optical axis X. Therefore, it is favorable for promoting an applicable range of the height compensation structure 528, and it is also favorable for controlling a warpage of the inner diameter portion 525 to decrease an excessive warpage or an excessive correction.

In detail, in FIGS. 5A and 5B, the height compensation structure 528 can be directly contacted with an adjacent lens element, and the lens element adjacent to the height compensation structure 528 can include a full circle form structure surface 511 for corresponding to and being directly contacted with the height compensation structure 528. Via a space arrangement of the lens element, a supporting effect of a structure can be further used, and an ability of improving the warpage and a distortion can be promoted. According to the 5th example, the height compensation structure 528 is directly contacted with the image-side lens element 530, and the image-side lens element 530 includes the full circle form structure surface 511 for corresponding to and being directly contacted with the height compensation structure 528. Therefore, the supporting stability of the image-side lens element 530 and the height compensation structure 528 can be increased, and it is favorable for controlling a changing trend of the warpage to further promote an accuracy of compensating for the warpage. According to the 5th example, a warpage of suffering the compression stress is −42.9 μm, a warpage of suffering the compression stress and the baking process is 1.2 μm. Moreover, the warpage is the height difference Δd between the inner diameter surface 527 and the outer diameter surface 524 along the direction parallel to the optical axis X.

In FIG. 5D, according to the 5th example, the light blocking sheet 520 can be a composite light blocking sheet, and the light blocking sheet 520 further includes a first surface layer (its reference numeral is omitted), a second surface layer (its reference numeral is omitted) and an inside substrate layer (its reference numeral is omitted), wherein the inside substrate layer is located between the first surface layer and the second surface layer, and the inside substrate layer is connected to the first surface layer and the second surface layer. Furthermore, the inside substrate layer is made of a plastic material layer, and the first surface layer and the second surface layer are made of a black carbon material layer, wherein the plastic material layer can be a black/transparent PC material, a black/transparent PET material or a black/transparent PMMA material.

The central opening 526 of the light blocking sheet 520 can be an aperture stop of the imaging optical element set. Therefore, it is favorable for promoting an optical quality of the imaging optical element set.

In FIGS. 5A and 5C, according to the 5th example, when the maximum height of the height compensation structure 528 is H, the height difference between the inner diameter surface 527 and the outer diameter surface 524 along the direction parallel to the optical axis X is Δd, a thickness of the light blocking sheet 520 is s, the following conditions of the Table 5 are satisfied.

TABLE 5

| 5th example | |
|---|---|
| H (mm) | 0.0641 |
| Δd (mm) (suffering the compression stress) | 0.0429 |
| Δd (mm) (suffering the compression stress and the baking process) | 0.0012 |
| Δd/H (suffering the compression stress) | 0.669 |
| Δd/H (suffering the compression stress and the baking process) | 0.019 |
| s (mm) | 0.023 |
| H/s | 2.787 |

6th Example

Figure 6A:
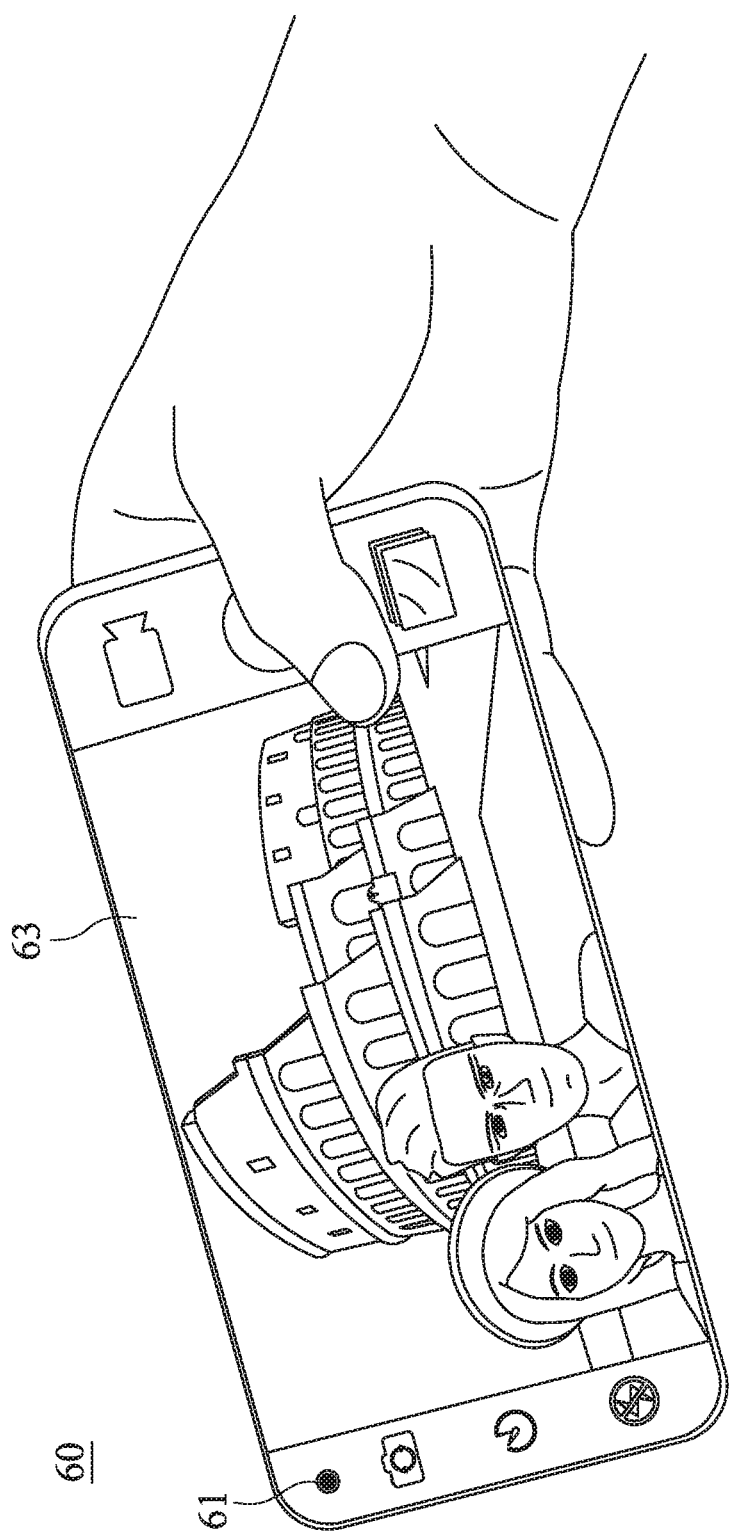
FIG. 6A is a schematic view of an electronic device according to the 6th example of the present disclosure.
Figure 6B:
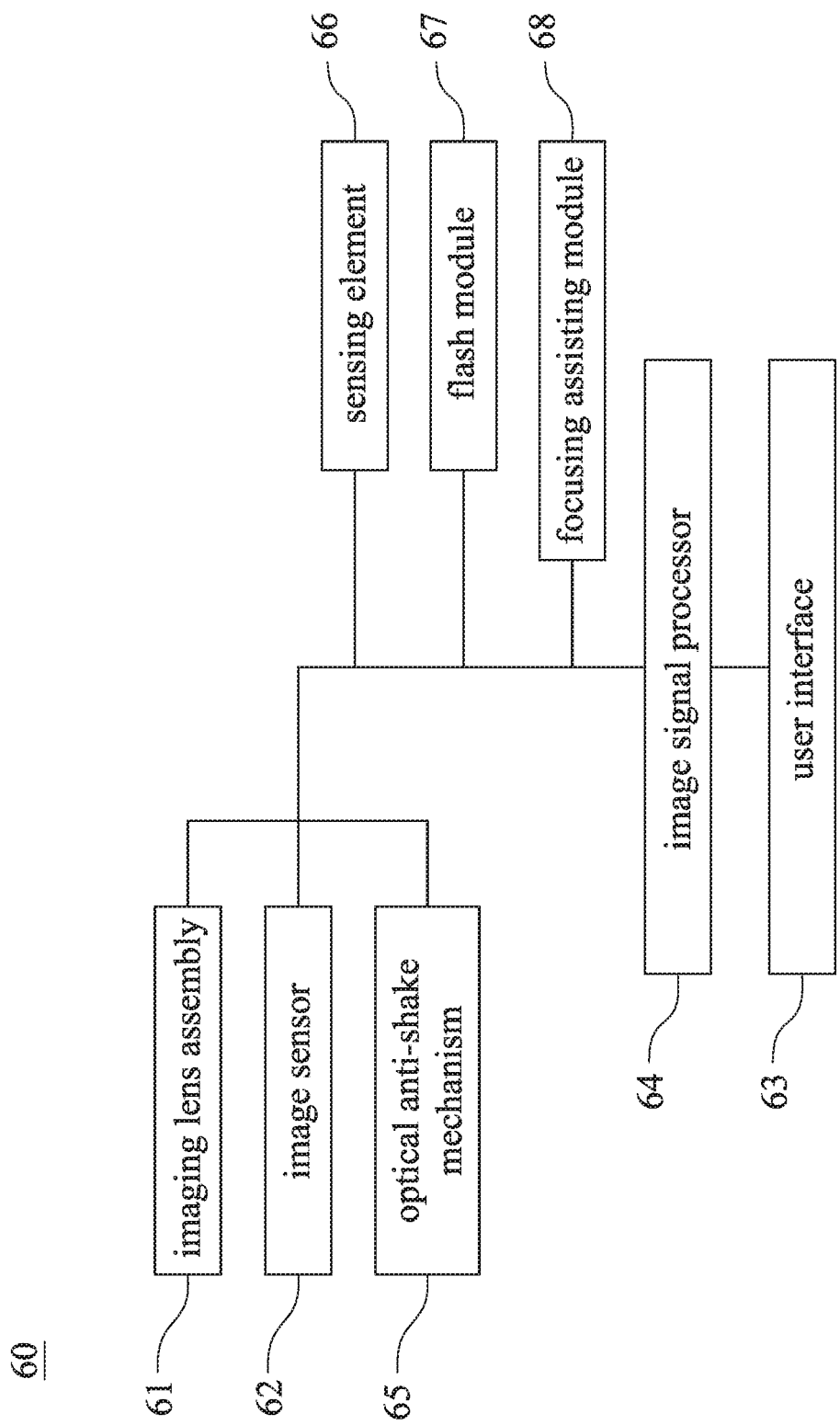
FIG. 6B is a block diagram of the electronic device according to the 6th example in FIG. 6A.

FIG. 6A is a schematic view of an electronic device 60 according to the 6th example of the present disclosure. FIG. 6B is a block diagram of the electronic device 60 according to the 6th example in FIG. 6A. In FIGS. 6A and 6B, the electronic device 60 is a smart phone, and includes an imaging lens assembly 61, a user interface 63 and an image sensor 62. The imaging lens assembly 61 according to the 6th example is disposed on an area of a side of the user interface 63, the image sensor 62 is disposed on an image surface (not shown) of the imaging lens assembly 61, wherein the user interface 63 can be a touch screen or a display screen, but is not limited thereto. The imaging lens assembly 61 can be one of the imaging lens assembly according to the aforementioned 1st example to the 5th example, and the imaging lens assembly 61 includes a lens barrel (not shown) and an imaging optical element set (not shown), wherein the central opening (not shown) of the light blocking sheet (not shown) of the imaging optical element set is corresponding to a minimum central opening (not shown) of the lens barrel, but is not limited thereto.

Moreover, users enter a shooting mode via the user interface 63 of the electronic device 60. At this moment, the imaging light is gathered on the image sensor 62 via the imaging lens assembly 61, and an electronic signal about an image is output to an image signal processor (ISP) 64.

To meet a specification of a camera of the electronic device 60, the electronic device 60 can further include an optical anti-shake mechanism 65, which can be an optical image stabilization (OIS). Furthermore, the electronic device 60 can further include at least one auxiliary optical element (its reference numeral is omitted) and at least one sensing element 66. According to the 6th example, the auxiliary optical element is a flash module 67 and a focusing assisting module 68. The flash module 67 can be for compensating a color temperature, and the focusing assisting module 68 can be an infrared distance measurement component, a laser focus module, etc. The sensing element 66 can have functions for sensing physical momentum and kinetic energy, such as an accelerator, a gyroscope, a Hall Effect Element, to sense shaking or jitters applied by hands of the user or external environments. Accordingly, the imaging lens assembly 61 of the electronic device 60 equipped with an auto-focusing mechanism and the optical anti-shake mechanism 65 can be enhanced to achieve the superior image quality. Furthermore, the electronic device 60 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 60 can further include, but not be limited to, a display, a control unit, a storage unit, a random access memory (RAM), a read-only memory (ROM), or the combination thereof.

Figure 6C:
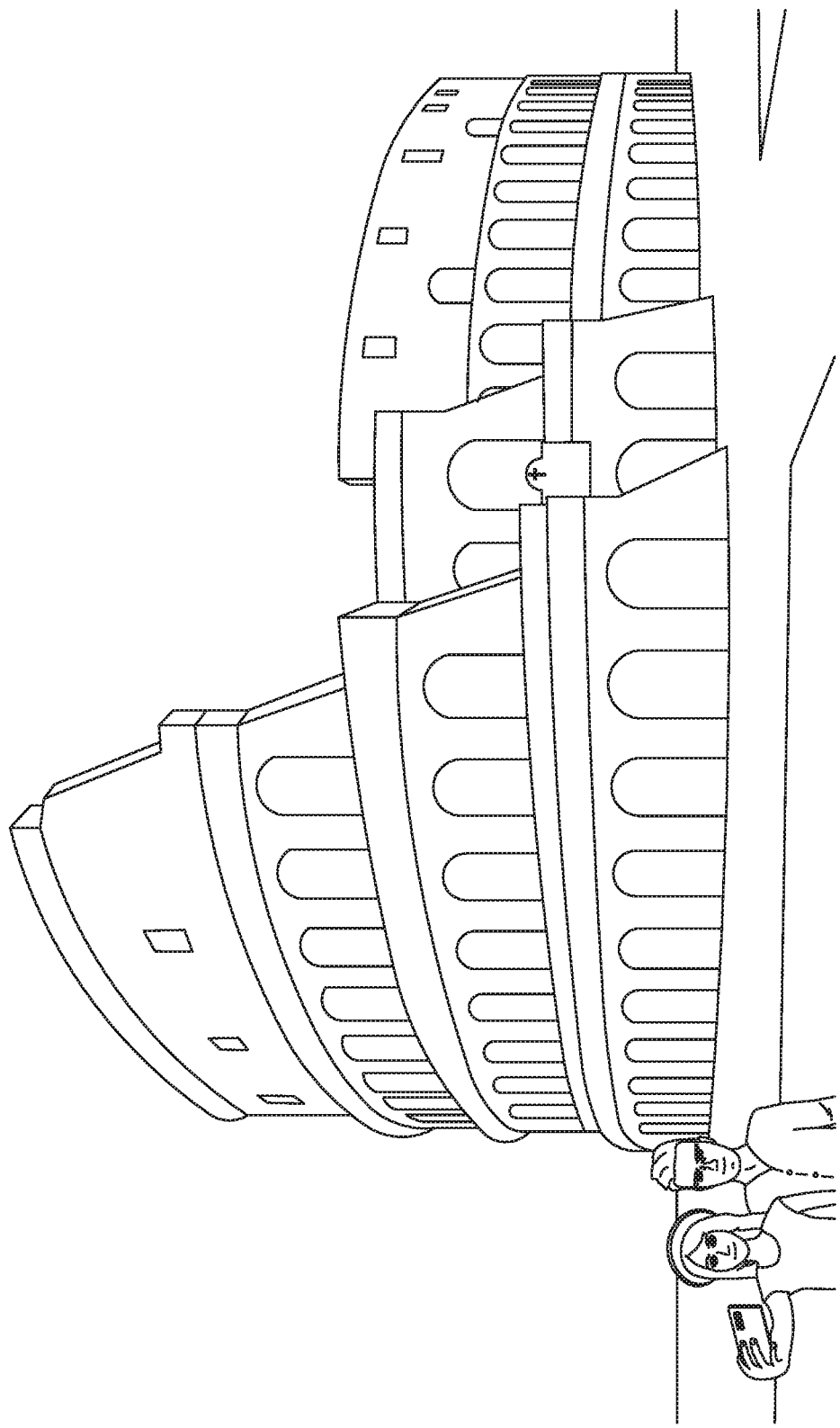
FIG. 6C is a schematic view of a selfie scene according to the 6th example in FIG. 6A.
Figure 6D:
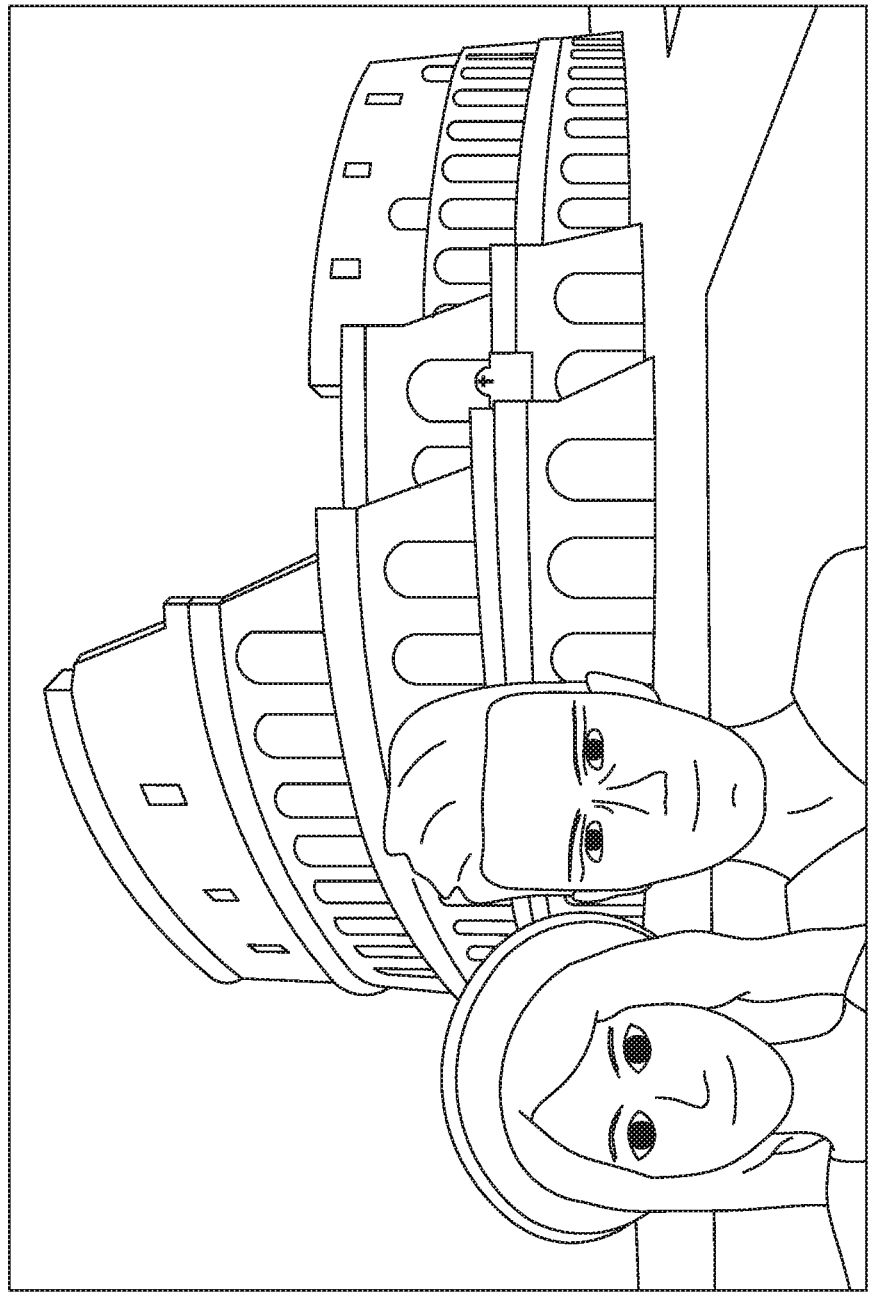
FIG. 6D is a schematic view of a captured image according to the 6th example in FIG. 6A.
Figure 7:
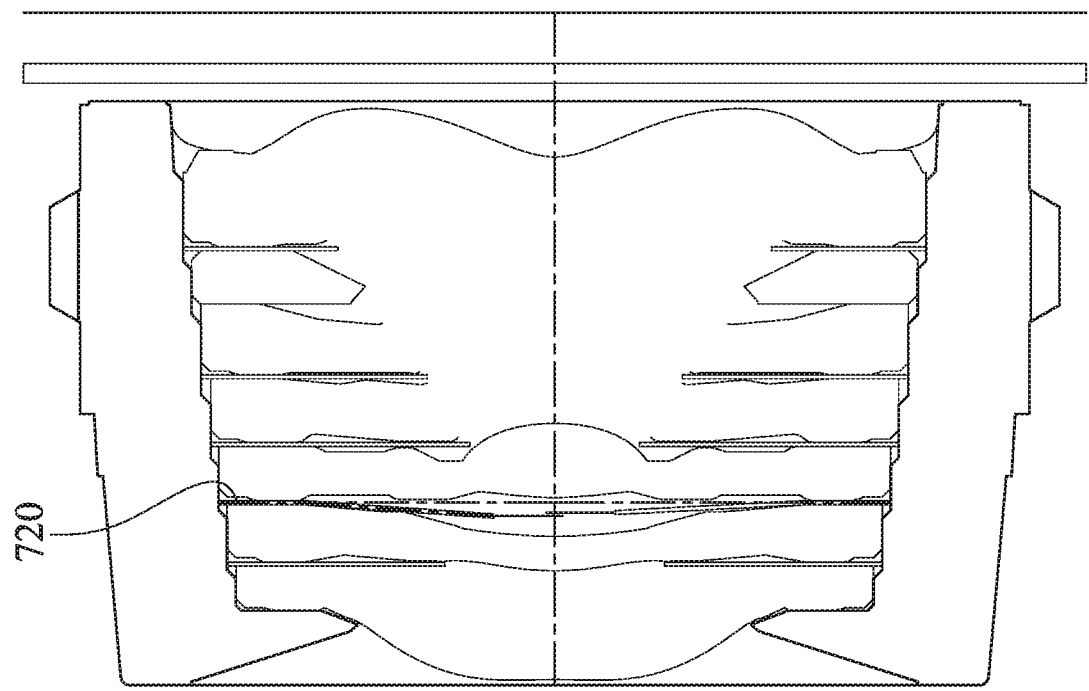
FIG. 7 is a schematic view of an electronic device of the conventional art, wherein an imaging lens assembly of the electronic device is performed with a baking process.

FIG. 6C is a schematic view of a selfie scene according to the 6th example in FIG. 6A. FIG. 6D is a schematic view of a captured image according to the 6th example in FIG. 6A. In FIGS. 6A to 6D, the imaging lens assembly 61 and the user interface 63 face towards the users. When proceeding selfie or live streaming, the users can watch a captured image and operate an interface at the same time, and the capture image as FIG. 6D can be obtained after shooting. Therefore, better shooting experience can be provided via the imaging lens assembly 61 of the present disclosure.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical element set, which has an optical axis, comprising:
    at least one object-side lens element;
    at least one image-side lens element; and at least one light blocking sheet, interposed between the at least one object-side lens element and the at least one image-side lens element, and comprising:
an object-side outer surface, toward an object side of the imaging optical element set;
an image-side outer surface, opposite to the object-side outer surface;
an outer diameter portion, having an outer diameter surface connected to the object-side outer surface and the image-side outer surface;
an inner diameter portion, defining a central opening of the at least one light blocking sheet, and having an inner diameter surface connected to the object-side outer surface and the image-side outer surface; and
a height compensation structure, being in full circle form, surrounding the central opening, and for adjusting a height difference between the inner diameter surface and the outer diameter surface along a direction parallel to the optical axis, wherein the height compensation structure, in order from the outer diameter surface of the at least one light blocking sheet to the central opening, comprises:
a first side wall, extending from one of the object-side outer surface and the image-side outer surface to away from the other one of the object-side outer surface and the image-side outer surface; and
a second side wall, extending from the one of the object-side outer surface and the image-side outer surface to close to the other one of the object-side outer surface and the image-side outer surface;
wherein an increase or a decrease of the height difference between the inner diameter surface and the outer diameter surface along the direction parallel to the optical axis is formed via a deformation of the height compensation structure;
wherein a maximum height of the height compensation structure is H, the height difference between the inner diameter surface and the outer diameter surface along the direction parallel to the optical axis is $\Delta d$, and the following condition is satisfied:

$0.0 \leq \Delta d/H < 0.85$.

2. The imaging optical element set of claim 1, wherein the maximum height of the height compensation structure is H, the height difference between the inner diameter surface and the outer diameter surface along the direction parallel to the optical axis is $\Delta d$, and the following condition is satisfied:

$0.0 \leq \Delta d/H < 0.55$.

3. The imaging optical element set of claim 2, wherein the height compensation structure is directly contacted with an adjacent lens element.

4. The imaging optical element set of claim 3, wherein the lens element adjacent to the height compensation structure comprises a full circle form structure surface for corresponding to and being directly contacted with the height compensation structure.

5. The imaging optical element set of claim 2, wherein the height difference between the inner diameter surface and the outer diameter surface along the direction parallel to the optical axis is $\Delta d$, and the following condition is satisfied:

$0.0 \text{ mm} \leq \Delta d < 0.02 \text{ mm}$.

6. The imaging optical element set of claim 1, wherein a thickness of the at least one light blocking sheet is s, and the following condition is satisfied:

$0.0 \text{ mm} < s < 0.12 \text{ mm}$.

7. The imaging optical element set of claim 6, wherein the maximum height of the height compensation structure is H, the thickness of the at least one light blocking sheet is s, and the following condition is satisfied:

$0.7 \leq H/s < 5.0$.

8. The imaging optical element set of claim 6, wherein the central opening of the at least one light blocking sheet is an aperture stop of the imaging optical element set.

9. The imaging optical element set of claim 1, wherein the maximum height of the height compensation structure is H, the height difference between the inner diameter surface and the outer diameter surface along the direction parallel to the optical axis is $\Delta d$, and the following condition is satisfied:

$0.0 \leq \Delta d/H < 0.35$.

10. An imaging lens assembly, comprising:
a lens barrel; and
the imaging optical element set of claim 1, wherein the imaging optical element set is disposed in the lens barrel, and the central opening of the at least one light blocking sheet of the imaging optical element set is corresponding to a minimum central opening of the lens barrel.

11. An electronic device, comprising:
the imaging lens assembly of claim 10; and
an image sensor, disposed on an image surface of the imaging lens assembly.

* * * * *